US012720543B2

(12) United States Patent
Jiang et al.

(10) Patent No.: US 12,720,543 B2
(45) Date of Patent: Aug. 25, 2026

(54) APPARATUS AND METHOD USED FOR PDSCHS SCHEDULING AND SPS ACTIVATION BY DCI

(71) Applicant: 1FINITY Inc., Kawasaki (JP)

(72) Inventors: Qinyan Jiang, Beijing (CN); Lei Zhang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 293 days.

(21) Appl. No.: 18/430,071

(22) Filed: Feb. 1, 2024

(65) Prior Publication Data

US 2024/0260036 A1 Aug. 1, 2024

Related U.S. Application Data

(63) Continuation of application No. PCT/CN2021/111061, filed on Aug. 5, 2021.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04W 72/11* (2023.01); *H04W 72/232* (2023.01)

(58) Field of Classification Search
CPC ............. H04W 72/1273; H04W 72/11; H04W 72/232; H04W 72/12; H04W 72/23;
(Continued)

(56) References Cited

U.S. PATENT DOCUMENTS

2019/0312713 A1 10/2019 Yang et al.
2021/0051634 A1 2/2021 Fakoorian et al.
(Continued)

FOREIGN PATENT DOCUMENTS

CN 104756571 A 7/2015
CN 110278062 A 9/2019
(Continued)

OTHER PUBLICATIONS

International Search Report and Written Opinion of the International Searching Authority issued by the China National Intellectual Property Administration for corresponding International Patent Application No. PCT/CN2021/111061, mailed on Apr. 8, 2022, with an English translation.
(Continued)

*Primary Examiner* — Thai Nguyen
(74) *Attorney, Agent, or Firm* — Myers Wolin, LLC

(57) ABSTRACT

Embodiments of this disclosure provide a data scheduling method and data transmitting method and apparatuses thereof. The data scheduling apparatus includes: a first receiving unit configured to receive downlink control information (DCI) for scheduling a physical downlink shared channel (PDSCH), the DCI including a first information field for indicating time domain resource of at least one (M) PDSCH; and a first validating unit configured to validate that the DCI is used for semi-persistent scheduling (SPS) activation or is not used for SPS activation according to the first information field and/or according to a PDSCH time domain resource assignment table applied by the DCI and/or a format of the DCI.

20 Claims, 17 Drawing Sheets

301 terminal equipment receives, downlink control information (DCI) for SPS activation, wherein the DCI includes a first information domain for indicating time domain resource of at least one (M) PDSCH, and a PDSCH time domain resource assignment table applied by the DCI supports one DCI scheduling a plurality of PDSCHs

302 the terminal equipment receives an SPS PDSCH

(51) Int. Cl.
*H04W 72/11* (2023.01)
*H04W 72/232* (2023.01)

(58) Field of Classification Search
CPC ............. H04W 72/04; H04W 72/0446; H04W 72/231; H04L 1/1812; H04L 5/0053; H04L 5/0094; H04L 27/26025
See application file for complete search history.

(56) References Cited

U.S. PATENT DOCUMENTS

| | | | | |
|---|---|---|---|---|
| 2021/0160829 | A1* | 5/2021 | Park | H04L 1/1887 |
| 2021/0184798 | A1 | 6/2021 | Park et al. | |
| 2021/0227570 | A1* | 7/2021 | Park | H04L 1/189 |
| 2022/0264612 | A1 | 8/2022 | Yang et al. | |

FOREIGN PATENT DOCUMENTS

| | | | | |
|---|---|---|---|---|
| CN | 110913488 | A | 3/2020 | |
| CN | 111615198 | A | 9/2020 | |
| CN | 111867115 | A | 10/2020 | |
| CN | 111919407 | A | 11/2020 | |
| CN | 112351492 | A | 2/2021 | |
| CN | 112583558 | A | 3/2021 | |
| WO | 2020/224924 | A1 | 11/2020 | |
| WO | 2020/225048 | A1 | 11/2020 | |
| WO | 2021/034063 | A1 | 2/2021 | |
| WO | 2021/084504 | A1 | 5/2021 | |
| WO | 2021/101352 | A1 | 5/2021 | |
| WO | WO-2022017354 | A1 * | 1/2022 | H04W 72/23 |

OTHER PUBLICATIONS

LG Electronics, "Discussion on blind/HARQ-less PDSCH repetition for URLLC", Agenda Item: 6.2.8.1, 3GPP TSG RAN WG1 Meeting #93, R1-1806598, Busan, Republic of Korea, May 21-25, 2018.

CMCC, "Discussion on DL SPS enhancements", Agenda Item: 7.2.6.7, 3GPP TSG RAN WG1 #98 bis, R1-1910169, Chongqing, China, Oct. 14-20, 2019.

Samsung, "On timing between DCI indicating active BWP switching and active BWP switching", Agenda Item: 7.3.2.5, 3GPP TSG RAN WG1 Meeting 91, R1-1720338, Reno, USA, Nov. 27-Dec. 1, 2017.

Notice of Reasons for Refusal issued by the Japan Patent Office for corresponding Japanese Patent Application No. 2024-506565, mailed on Jul. 15, 2025, with an English translation.

3GPP TS 38.214 V16.6.0 (Jun. 2021) "3rd Generation Partnership Project, Technical Specification Group Radio Access Network; NR; Physical layer procedures for data (Release 16)", Jun. 30, 2021.

Ericsson, "PDSCH/PUSCH enhancements", Agenda item: 8.2.5, 3GPP TSG-RAN WG1 Meeting #104-e, Tdoc R1-2101310, Online, Jan. 25-Feb. 5, 2021.

The Extended European search report with the Supplementary European search report and the European search opinion, issued by the European Patent Office for corresponding European Patent Application No. 21952371.9, mailed on May 9, 2025.

Notice of Reasons for Refusal issued by the Japan Patent Office for corresponding Japanese Patent Application No. 2024-506565, mailed on Feb. 18, 2025, with an English translation.

Ericsson, "Corrections for multi-TRP transmission", Agenda Item: 7.2.6.2, 3GPP TSG RAN WG1 #100-e, R1-2000941, Online, Feb. 24-Mar. 6, 2020.

Lenovo et al., "Corrections to DL SPS test case", Work item code: 5GS_NR_LTE-UEConTest, 3GPP TSG-RAN5 Meeting #90-e, R5-210567, Electronic Meeting, Feb. 22-Mar. 5, 2021.

LG Electronics, "PDSCH/PUSCH enhancements to support NR above 52.6 GHZ", Agenda Item: 8.2.5, 3GPP TSG RAN WG1 #105-e, R1-2105421, e-Meeting, May 10-27, 2021.

Ericsson, "Other Enhancements to Uplink and Downlink Transmissions for NR URLLC—Support for Shorter DL SPS Periodicities", Agenda Item: 7.2.6.7, 3GPP TSG RAN WG1 #98, R1-1908127, Prague, Czech Republic, Aug. 26-30, 2019.

"RAN1 Chairman's Notes", 3GPP TSG RAN WG1 #104-E, e-Meeting, Jan. 25-Feb. 5, 2021.

Notice of Preliminary Rejection issued by the Korean Intellectual Property Office for corresponding Korean Patent Application No. 10-2024-7004160, mailed on Feb. 23, 2026, with an English translation.

* cited by examiner

201 terminal equipment receives, first indication information for configuring a PDSCH time domain resource assignment table, wherein the PDSCH time domain resource assignment table is used to support one DCI scheduling a plurality of PDSCHs

202 the terminal equipment receives DCI used for scheduling a PDSCH

901 a terminal equipment receives downlink control information (DCI), the DCI including a first information domain for indicating time domain resource of at least one (M) PDSCHs

902 the terminal equipment Validates that the DCI is used for semi-persistent scheduling (SPS) activation or is not used for SPS activation according to a first information domain of the DCI and/or according to a PDSCH time domain resource assignment table applied by the DCI and/or a format of the DCI

Fig. 9

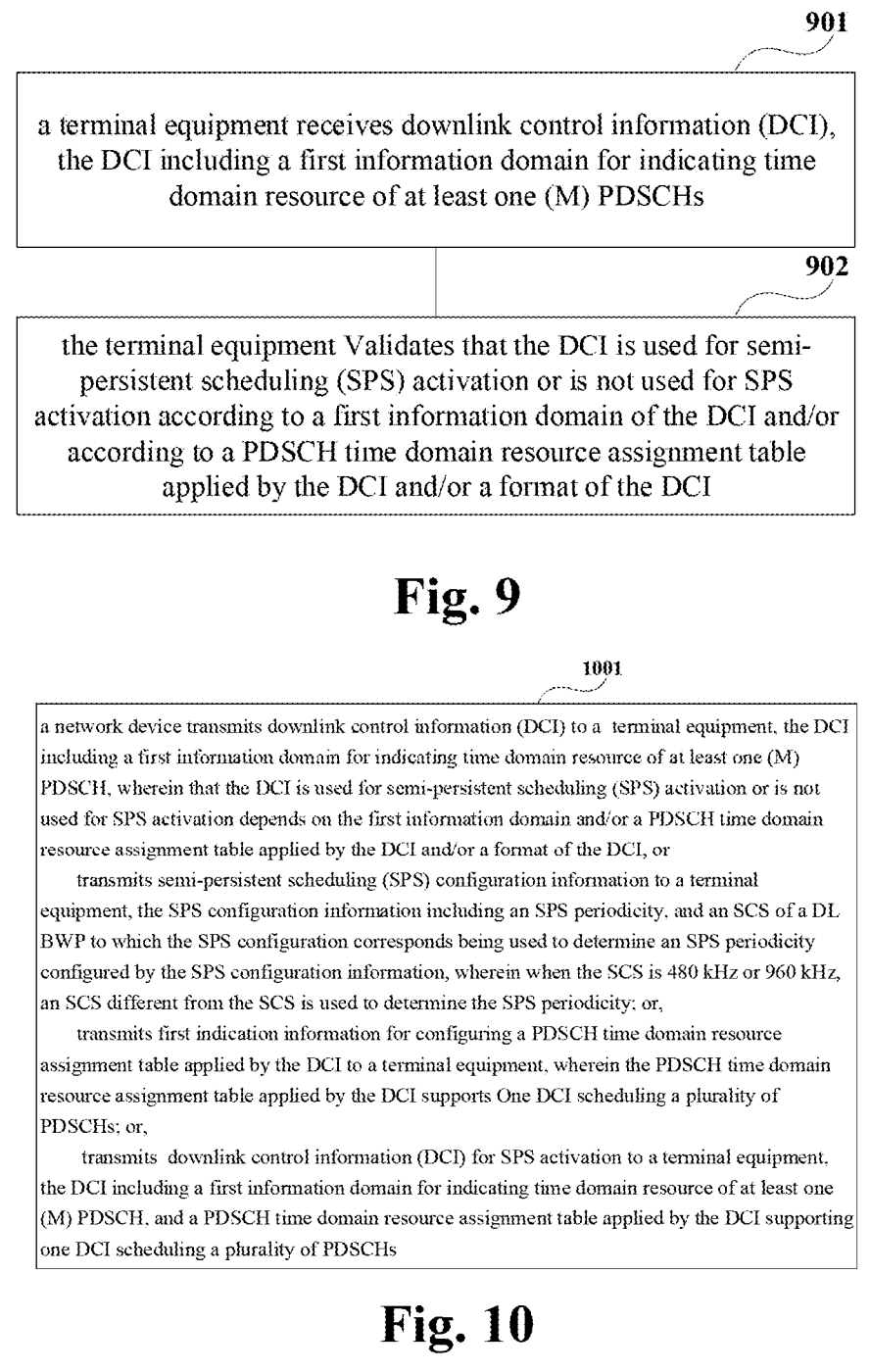

1001 a network device transmits downlink control information (DCI) to a terminal equipment, the DCI including a first information domain for indicating time domain resource of at least one (M) PDSCH, wherein that the DCI is used for semi-persistent scheduling (SPS) activation or is not used for SPS activation depends on the first information domain and/or a PDSCH time domain resource assignment table applied by the DCI and/or a format of the DCI, or transmits semi-persistent scheduling (SPS) configuration information to a terminal equipment, the SPS configuration information including an SPS periodicity, and an SCS of a DL BWP to which the SPS configuration corresponds being used to determine an SPS periodicity configured by the SPS configuration information, wherein when the SCS is 480 kHz or 960 kHz, an SCS different from the SCS is used to determine the SPS periodicity; or, transmits first indication information for configuring a PDSCH time domain resource assignment table applied by the DCI to a terminal equipment, wherein the PDSCH time domain resource assignment table applied by the DCI supports One DCI scheduling a plurality of PDSCHs; or, transmits downlink control information (DCI) for SPS activation to a terminal equipment, the DCI including a first information domain for indicating time domain resource of at least one (M) PDSCH, and a PDSCH time domain resource assignment table applied by the DCI supporting one DCI scheduling a plurality of PDSCHs

Fig. 10

APPARATUS AND METHOD USED FOR PDSCHS SCHEDULING AND SPS ACTIVATION BY DCI

CROSS-REFERENCE TO RELATED APPLICATION

This application is a continuation of International Application No. PCT/CN2021/111061, filed on Aug. 5, 2021, the entire contents of which are incorporated herein by reference.

TECHNICAL FIELD

This disclosure relates to the field of communication technologies.

BACKGROUND

A physical downlink shared channel (PDSCH) is one of physical downlink channels in a wireless communication system, and is used to carry downlink data. The PDSCH may be scheduled via downlink control information (DCI). The DCI used for scheduling the PDSCH at least includes information indicating resources of the PDSCH. In an existing New Radio (NR) system, a plurality of DCI formats for scheduling PDSCHs are defined, such as DCI format 1_0, DCI format 1_1, and DCI format 1_2. Specific information and/or sizes included in DCI in different DCI formats are different, so as to meet different demands for scheduling.

It should be noted that the above description of the background is merely provided for clear and complete explanation of this disclosure and for easy understanding by those skilled in the art. And it should not be understood that the above technical solution is known to those skilled in the art as it is described in the background art of this disclosure.

SUMMARY OF THE DISCLOSURE

At present, DCI may be used for semi-persistent scheduling (SPS) activation or deactivation, and when it is used for SPS activation, it is also used to indicate time domain resource assignment of SPS. In order to alleviate a burden of DCI monitoring on a terminal equipment reduce power consumption and complexity, an NR system supports one DCI scheduling a plurality of PDSCHs. However, there is currently no specific solution on how to support one DCI scheduling a plurality of PDSCHs (such as how to support a corresponding time domain resource assignment (TDRA) table configuration, and how to support corresponding HARQ-ACK information feedback, etc.), and there is even no solution to a technical problem of how to support SPS activation/retransmission when it supports one DCI scheduling a plurality of PDSCHs.

In order to solve at least one of the above problems, embodiments of this disclosure provide a data scheduling method and data transmitting method and apparatuses thereof.

According to one aspect of the embodiments of this disclosure, there is provided a data scheduling apparatus, applicable to a terminal equipment, the apparatus including:

a first receiving unit configured to receive downlink control information (DCI) for scheduling a physical downlink shared channel (PDSCH), the DCI including a first information field for indicating time domain resource of at least one (M) PDSCH; and a first validating unit configured to validate that the DCI is used for semi-persistent scheduling (SPS) activation or is not used for SPS activation according to the first information field and/or according to a PDSCH time domain resource assignment table applied by the DCI and/or a format of the DCI (DCI format).

According to another aspect of the embodiments of this disclosure, there is provided a data scheduling apparatus, applicable to a terminal equipment, the apparatus including:

a third receiving unit configured to receive downlink control information (DCI) for SPS activation, wherein the DCI includes a first information field for indicating time domain resource of at least one (M) PDSCH, and a PDSCH time domain resource assignment table applied by the DCI supports one DCI scheduling a plurality of PDSCHs; and a fourth receiving unit configured to receive an SPS PDSCH.

According to a further aspect of the embodiments of this disclosure, there is provided a data scheduling apparatus, applicable to a terminal equipment, the apparatus including:

a fifth receiving unit configured to receive first indication information for configuring a PDSCH time domain resource assignment table, wherein the PDSCH time domain resource assignment table is used to support one DCI scheduling a plurality of PDSCHs; and a sixth receiving unit configured to receive downlink control information (DCI) used for scheduling a PDSCH.

An advantage of the embodiments of this disclosure exists in that a PDSCH time domain resource assignment table may be made to support one DCI scheduling a plurality of PDSCHs, thereby supporting one DCI scheduling a plurality of PDSCHs, reducing DCI monitoring burden of a terminal equipment, and lowering power consumption and complexity.

Another advantage of the embodiments of this disclosure exists in that a PDSCH time domain resource assignment table applied by downlink control information (DCI) used for SPS activation may be made to support one DCI scheduling a plurality of PDSCHs, thereby supporting SPS activation/retransmission while supporting one DCI scheduling a plurality of PDSCHs.

A further advantage of the embodiments of this disclosure exists in that DCI is used for semi-persistent scheduling (SPS) activation or not used for semi-persistent scheduling (SPS) activation is validated according to a first information field of the DCI and/or according to a PDSCH time domain resource assignment table applied by the DCI and/or a DCI format, thereby supporting SPS activation/retransmission while supporting one DCI scheduling a plurality of PDSCHs.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term “comprises/comprising/including/includes” when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

FIG. 9 is a schematic diagram of the data scheduling method of an embodiment of this disclosure;

FIG. 10 is a schematic diagram of the data transmitting method of an embodiment of this disclosure;

DETAILED DESCRIPTION OF THE DISCLOSURE

Figures 1, 2:
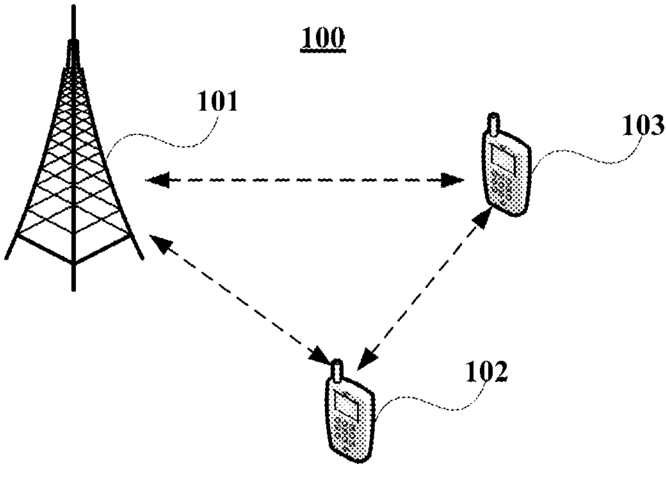
FIG. 1 is schematic diagram of a communication system of an embodiment of this disclosure.
FIG. 2 is a schematic diagram of the data scheduling method of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc. And communication between devices in a communication system may be performed according to communication protocols at any stage, which may, for example, include but not limited to the following communication protocols: 1G (generation), 2G, 2.5G, 2.75G, 3G, 4G, 4.5G and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station or a core network device, and may include one or more network devices described above. The term "user side" or "terminal side" or "terminal equipment side" refers to a side of a user or a terminal, which may be a UE, and may include one or more terminal equipments described above. "Device" may refer to a network device, or may refer to a terminal equipment.

In the following explanation, without causing confusion, the terms "uplink control signal" and "uplink control information (UCI)" or "physical uplink control channel (PUCCH)" can be interchanged, and the terms "uplink data signal" and "uplink data information" or "physical uplink shared channel (PUSCH)" can be interchanged;

The terms "downlink control signal" and "downlink control information (DCI)" or "physical downlink control channel (PDCCH)" can be interchanged, while the terms "downlink data signal" and "downlink data information" or "physical downlink shared channel (PDSCH)" can be interchanged.

In addition, transmitting or receiving a PUSCH may be understood as transmitting or receiving uplink data carried by the PUSCH, transmitting or receiving a PUCCH may be understood as transmitting or receiving uplink information (e.g. UCI) carried by the PUCCH, transmitting or receiving a PRACH may be understood as transmitting or receiving a preamble carried by the PRACH, transmitting or receiving a PDSCH may be understood as transmitting or receiving downlink information data carried by the PDSCH, and transmitting or receiving a PDCCH may be understood as transmitting or receiving downlink information (e.g. DCI) carried by the PDCCH.

In the embodiments of this disclosure, higher-layer signaling may be, for example, radio resource control (RRC) signaling, the RRC signaling including, for example, an RRC message, which includes, for example, a master information block (MIB), system information, and a dedicated RRC message, or including, for example, an RRC information element (RRC IE), or an information field (an information field included in the information field) included in the RRC message or the RRC information element. The higher-layer signaling may also be, for example, media access control (MAC) signaling, or may be referred to as an MAC control element (MAC CE). However, this disclosure is not limited thereto.

Scenarios of the embodiments of this disclosure shall be described below by way of example; however, this disclosure is not limited thereto.

FIG. 1 is schematic diagram of a communication system of an embodiment of this disclosure, in which a case where terminal equipments and a network device are taken as examples is schematically shown. As shown in FIG. 1, a communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiment of this disclosure, existing services or services that may be implemented in the future may be performed between the network device 101 and the terminal equipments 102, 103. For example, such services may include but not limited to an enhanced mobile broadband (eMBB), massive machine type communication (mMTC), ultra-reliable and low-latency communication (URLLC), and related communications of reduced capability terminal equipments, etc.

It should be noted that FIG. 1 shows that the two terminal equipments 102 and 103 are both within the coverage of the network device 101; however, the embodiment of this disclosure is not limited thereto. The two terminal equipments 102 and 103 may not be within the coverage of network device 101, or one terminal equipment 102 may be within the coverage of network device 101, and the other terminal equipment 103 may be outside the coverage of network device 101.

In the embodiment of this disclosure, transport blocks carried by different PDSCHs are identical or different. Therefore, "a plurality of PDSCHs" or "at least two PDSCHs" in the following refer to different PDSCHs carrying different transport blocks. More specifically, transport blocks carried by different PDSCHs may correspond to identical or different HARQ processes, wherein different HARQ processes are identified by different HARQ process identifiers.

In some embodiments, a PDSCH time domain resource assignment (TDRA) table (or a TDRA table in brief) includes at least one row, one row is hereinafter referred to as one PDSCH TDRA configuration (or a TDRA configuration in brief) for ease of description, that is, the PDSCH TDRA table includes at least one PDSCH TDRA configuration. A PDSCH TDRA configuration includes at least one PDSCH time domain resource configuration (or referred to as a time domain resource configuration in brief), which at least includes a symbol position (starting symbol+length) configuration in a slot; in addition, a PDSCH TDRA configuration may further include at least one slot offset K0 configuration, K0 denoting a slot offset between a PDSCH and a PDCCH, and the K0 configuration being included or not included in the PDSCH time domain resource configuration; the PDSCH TDRA configuration may further include other information, which is included or not included in a PDSCH time domain resource configuration, and the embodiments of this disclosure are not limited thereto. Regarding the symbol position configuration in the slot, it includes, for example, a start and length indicator SLIV, the SLIV corresponding to a valid combination of a starting symbol (S) and a length (L), or, for example, corresponding to a starting symbol configuration and a length configuration, the starting symbol configuration and length configuration being a valid combination.

An NR system supports one DCI scheduling a plurality of PDSCHs; however, there exists currently no solution for how to schedule one DCI scheduling a plurality of PDSCHs (such as how to support a corresponding time domain resource assignment (TDRA) table configuration and how to validate a TDRA table applied by the DCI when a corresponding TDRA table is configured), which shall be described below with reference to an embodiment of a first aspect.

Embodiment of a First Aspect

The embodiment of this disclosure provides a data scheduling method, which shall be described from a side of a terminal equipment.

FIG. 2 is a schematic diagram of the data scheduling method of the embodiment of this disclosure. As shown in FIG. 2, the method includes:

201: the terminal equipment receives, first indication information for configuring a PDSCH time domain resource assignment table, wherein the PDSCH time domain resource assignment table is used to support one DCI scheduling a plurality of PDSCHs;

202: the terminal equipment receives DCI used for scheduling a PDSCH.

In some embodiments, in existing schemes, the PDSCH time domain resource assignment table only supports one DCI scheduling one PDSCH, while in 201, the PDSCH time domain resource assignment table supports one DCI scheduling a plurality of PDSCHs. Therefore, one DCI scheduling a plurality of PDSCHs in 202 may be supported, thereby reducing a DCI monitoring burden on the terminal equipment, and reducing power consumption and complexity. In some embodiments, in order to support a scheduling mode for scheduling a plurality of PDSCHs by a DCI, the first indication information for configuring a PDSCH time domain resource assignment table is received in 201, wherein the PDSCH time domain resource assignment table is used to support one DCI scheduling a plurality of PDSCHs, that is, in 201, newly-introduced first indication information (e.g. pdsch-TimeDomainAllocationListForMultiPDSCH) is received, which is used to configure the PDSCH TDRA table used for supporting one DCI scheduling a plurality of PDSCHs.

In some embodiments, the PDSCH time domain resource assignment table used for supporting one DCI scheduling a plurality of PDSCHs is configured per BWP, the BWP being a DL BWP. For example, the first indication information used for configuring the table is included in a BWP configuration per BWP (e.g. BWP-DownlinkCommon, and BWP-DownlinkDedicated, etc.), and more specifically, in a PDSCH configuration pdsch-Config included in the BWP configuration BWP-DownlinkCommon.

In some embodiments, the PDSCH TDRA table for supporting one DCI scheduling a plurality of PDSCHs includes at least one PDSCH TDRA configuration for supporting one DCI scheduling a plurality of PDSCHs. Meanwhile, the table may include or may not include a PDSCH TDRA configuration for supporting one DCI scheduling one PDSCH. For example, the PDSCH TDRA table includes at least one (M) PDSCH TDRA configuration (at least one row), and in the M PDSCH TDRA configurations, there is at least one (P) PDSCH TDRA configuration used for supporting one DCI scheduling a plurality of PDSCHs, including M-P PDSCH TDRA configurations used for supporting one DCI scheduling one PDSCH; wherein, M is greater than or equal to P, and both M and P are integers greater than or equal to 1.

In some embodiments, the PDSCH TDRA configuration for supporting one DCI scheduling a plurality of PDSCHs includes at least two PDSCH time domain resource configurations (e.g. at least two SLIVs, each corresponding to a PDSCH).

In some embodiments, the PDSCH TDRA configuration for supporting one DCI scheduling one PDSCH includes only one PDSCH time domain resource configuration.

In some embodiments, the terminal equipment receives the DCI for scheduling the PDSCH, the DCI including a first information field, the first information field being a time domain resource assignment field. The first information field indicates the PDSCH time domain resource by indicating an index (a row index, e.g. a value of the row index is greater than or equal to 1) to which the PDSCH TDRA configuration in the PDSCH TDRA table applied by the DCI corresponds. In other words, the DCI schedules the PDSCHs by indicating the PDSCH TDRA configuration in the PDSCH TDRA table it applies. For example, a value m of the first information field of the DCI (assuming that m is an integer greater than or equal to 0) correspondingly indicates a PDSCH TDRA configuration with an index m+1 (i.e. an (m+1)-th row) in the PDSCH TDRA table applied by the DCI. In a case where the PDSCH TDRA table is configured by the first indication information, for example, the value of the index to which an (m+1)-th PDSCH TDRA configuration configured by the first indication information corresponds is m+1, that is, when the value of the first information field is m, it corresponds to an (m+1)-th PDSCH TDRA configuration configured by the first RRC signaling.

In some embodiments, in 202, when the PDSCH TDRA configuration indicated by the DCI (such as the first information field in the DCI) is used for supporting one DCI scheduling a plurality of PDSCHs (including a plurality of PDSCH time domain resource configurations), the UE may determine the time domain resources of the scheduled multiple PDSCHs according to the PDSCH time domain resource configurations (multiple SLIVs) included in the PDSCH TDRA configuration corresponding to multiple PDSCHs.

In some embodiments, the PDSCH TDRA table may be predefined, or may be configured via higher-layer signaling.

In some embodiments, the predefined PDSCH TDRA table is used for only supporting one DCI scheduling one PDSCH.

In some embodiments, the being used for only supporting one DCI scheduling one PDSCH refers to: only supporting one DCI scheduling one PDSCH, and not supporting one DCI scheduling a plurality of PDSCHs.

In some embodiments, the PDSCH TDRA table for only supporting one DCI scheduling a plurality of PDSCHs (or the PDSCH TDRA table only supporting one DCI scheduling one PDSCH) only includes the PDSCH TDRA configuration for supporting one DCI scheduling one PDSCH. For example, the PDSCH TDRA table includes at least one PDSCH TDRA configuration, and each PDSCH TDRA configuration only includes one PDSCH time domain resource configuration.

In some embodiments, the terminal equipment validates the PDSCH time domain resource assignment table applied by the DCI (or DCI with DL grant/assignment) for scheduling PDSCHs, and the method may further include (not shown): the terminal equipment validates the PDSCH time domain resource assignment table applied by the DCI according to a first list, a column of the first list corresponding to the first indication information (e.g. pdsch-TimeDomainAllocationListForMultiPDSCH) for configuring the PDSCH TDRA table for supporting one DCI scheduling a plurality of PDSCHs described in 201. The first indication information is included, for example, in PDSCH-Config. That is, according to the first list, the terminal equipment validates the PDSCH time domain resource assignment (TDRA) table applied by the DCI for scheduling the PDSCHs from the PDSCH time domain resource assignment (TDRA) table that is predefined or configured via higher-layer signaling.

In some embodiments, the first list is used to validate the PDSCH time domain resource assignment table applied by the DCI in a format of DCI format 1_1 or DCI format 1_2, and is not used to validate the PDSCH time domain resource assignment table applied by the DCI in a format of DCI format 1_0. For example, the DCI in the format of DCI format 1_0 may validate the PDSCH TDRA table applied by the DCI by using a second list, contents included in the second list being, for example, identical to those in an existing list applicable PDSCH time domain resource assignment for DCI formats 1_0 and 1_1). That is, the PDSCH TDRA table applied by the DCI in the formats of DCI format 1_0 and DCI format 1_1 is validated based on different lists.

In some embodiments, one of differences between the first list and the second list is that the first list further includes a column corresponding to the first indication information (e.g. pdsch-TimeDomainAllocationListForMultiPDSCH) for configuring the PDSCH TDRA table for supporting one DCI scheduling a plurality of PDSCHs, while the second list does not include a column corresponding to the first indication information for configuring the PDSCH TDRA table for supporting one DCI scheduling a plurality of PDSCHs. In other words, in validating the PDSCH TDRA table applied by the DCI, the second list does not take the first indication information for supporting one DCI scheduling a plurality of PDSCHs into account. Therefore, the PDSCH time domain resource assignment table applied by the DCI validated based on the second list may not be the PDSCH time domain resource assignment table for supporting one DCI scheduling a plurality of PDSCHs, and the PDSCH time domain resource assignment table applied by the DCI validated based on the first list may be the PDSCH time domain resource assignment table for supporting one DCI scheduling a plurality of PDSCHs.

In some embodiments, the format of the DCI is DCI format 1_1 or DCI format 1_2, and the PDSCH TDRA tables applied by the DCI are independent of a radio network temporary identifier (RNTI) scrambling cyclic redundancy check (CRC) of the DCI. For example, when the RNTI is a cell radio network temporary identifier (C-RNTI), or a modulation coding scheme C-RNTI (MCS-C-RNTI), or a configured scheduling RNTI (CS-RNTI), the PDSCH TDRA tables applied by the DCI are identical. Table 1 is an example table of the first list, wherein columns PDSCH-ConfigCommon includes pdsch-TimeDomainAllocationList and PDSCH-Config includes pdsch-TimeDomainAllocationList correspond respectively to second indication information (i.e. pdsch-TimeDomainAllocationList in PDSCH-ConfigCommon and pdsch-TimeDomainAllocationList in PDSCH-Config) configuring cell specific and UE specific PDSCH TDRA table for only supporting one DCI scheduling one PDSCH, and reference may be to existing techniques for meanings thereof, which shall not be repeated herein any further. According to Table 1, for transmitting DCI in a common search space that is not associated with CORESET 0 (or in other words, an associated CORESET is not a common search space of CORESET 0) or a UE-dedicated search space, in a case where the PDSCH TDRA table for supporting one DCI scheduling a plurality of PDSCHs is configured (that is, in a case where PDSCH-Config includes the first indication information (pdsch-TimeDomainAllocationListForMultiPDSCH) for configuring the PDSCH TDRA table or the UE receives the first indication information), the DCI applies the PDSCH TDRA table for supporting one DCI scheduling a plurality of PDSCHs when it is scrambled by a C-RNTI, or an MCS-C-RNTI, or a CS-RNTI.

TABLE 1

| RNTI | PDCCH search space | SS/PBCH block and CORESET multiplexing pattern | PDSCH-ConfigCommon includes pdsch-TimeDomainAllocationList | PDSCH-Config includes pdsch-TimeDomainAllocationList | PDSCH-Config includes pdsch-TimeDomainAllocationList ForMultiPDSCH | PDSCH time domain resource assignment to apply |
|---|---|---|---|---|---|---|
| C-RNTI, MCS-C-RNTI, CS-RNTI | Common search space associated with CORESET 0 | 1, 2, 3 | No | — | — | Default A |
| | | 1, 2, 3 | Yes | — | — | pdsch-TimeDomainAllocationList provided in PDSCH-ConfigCommon |
| C-RNTI, MCS-C-RNTI, CS-RNTI | Common search space that is not associated CORESET 0 | 1, 2, 3 | No | No | No | Default A |
| | | 1, 2, 3 | Yes | No | No | pdsch-TimeDomainAllocationList provided in PDSCH-ConfigCommon |
| | | 1, 2, 3 | No/Yes | Yes | No | pdsch-TimeDomainAllocationList provided in PDSCH-Config |
| | UE-dedicated search space | 1, 2, 3 | No/Yes | No/Yes | Yes | pdsch-TimeDomainAllocationList ForMultiPDSCH provided in PDSCH-Config |

In some embodiments, the format of the DCI is DCI format 1_1 or DCI format 1_2, and the PDSCH time domain resource assignment tables applied by the DCI scrambled by different RNTIs are different. (or, in other words, the PDSCH time domain resource assignment tables applied when DCI format 1_1 or DCI format 1_2 is scrambled by different RNTIs are different). For example, the PDSCH time domain resource assignment table applied when CS-RNTI is used for scrambling is different from a PDSCH time domain resource assignment table applied when a non-CS-RNTI (a C-RNTI or an MCS-C-RNTI) is used for scrambling.

For example, in a case where the DCI is scrambled by a non-CS-RNTI (a C-RNTI or an MCS-C-RNTI) (and the PDSCH time domain resource assignment table for supporting one DCI scheduling a plurality of PDSCHs is configured), the PDSCH time domain resource assignment table applied by the DCI is the PDSCH time domain resource assignment table for supporting one DCI scheduling a plurality of PDSCHs, and in a case where the DCI is scrambled by a CS-RNTI (and even though the PDSCH time domain resource assignment table for supporting one DCI scheduling a plurality of PDSCHs is configured), the PDSCH time domain resource assignment table applied by the DCI is not the PDSCH time domain resource assignment table for supporting one DCI scheduling a plurality of PDSCHs. In other words, when the DCI is scrambled by the CS-RNTI, the PDSCH time domain resource assignment table applied by the DCI is the PDSCH TDRA table only supporting one DCI scheduling one PDSCH.

Or, in other words, when the DCI is scrambled by the CS-RNTI (even if the first indication information is received), the PDSCH time domain resource assignment table applied by the DCI is not the PDSCH time domain resource assignment table configured by the first indication information, and when the DCI is scrambled by a non-CS-RNTI (a C-RNTI or an MCS-C-RNTI) (in a case where the first indication is received), the PDSCH time domain resource assignment table applied by the DCI is the PDSCH time domain resource assignment table configured by the first indication. As the DCI used for SPS activation must be scrambled by the CS-RNTI, even if the first indication configures the PDSCH TDRA table supporting one DCI scheduling a plurality of PDSCHs, it is unable be used for SPS activation.

In some embodiments, in a case where the PDSCH TDRA table for supporting one DCI scheduling a plurality of PDSCHs is configured via RRC signaling (including the first indication), the PDSCH TDRA table for only supporting one DCI scheduling one PDSCH must be configured via RRC signaling (including the second indication). That is, the PDSCH TDRA table for supporting one DCI scheduling a plurality of PDSCHs must be configured simultaneously with the PDSCH TDRA table for only supporting one DCI scheduling one PDSCH, meaning that both the first and second indication information need to be included in the RRC signaling.

Tables 2-1 and 2-2 below are example tables of the first list. What is different from Table 1 is that the PDSCH time domain resource assignment table applied when the CS-RNTI is used for scrambling is different from the PDSCH time domain resource assignment table applied when non-CS-RNTI (a C-RNTI or an MCS-C-RNTI) is used for scrambling. Additionally, in Table 2-1, at the same time as configuring the PDSCH TDRA table for supporting one DCI scheduling a plurality of PDSCHs by the first indication information, at least one PDSCH TDRA table for only supporting one DCI scheduling one PDSCH must be configured by the second indication information. In this way, even if the first indication information configures the PDSCH TDRA table for supporting one DCI scheduling a plurality of PDSCHs, the DCI with an RNTI that is a CS-RNTI may apply the PDSCH TDRA table for only supporting one DCI scheduling one PDSCH configured by the second indication information. In Table 2-2, in the case where the first indication information configures the PDSCH TDRA table for supporting one DCI scheduling a plurality of PDSCHs, the second indication information may not configure the PDSCH TDRA table for only supporting one DCI scheduling one PDSCH. When the first indication information configures the PDSCH TDRA table for supporting one DCI scheduling a plurality of PDSCHs and the second indication information does not configure the PDSCH TDRA table for only supporting one DCI scheduling one PDSCH, DCI format 1_1 with an RNTI that is a CS-RNTI may apply the predefined PDSCH TDRA table (e.g. the predefined PDSCH TDRA table characterized by Default A in the table, and the PDSCH TDRA configurations in the table are predefined, and each PDSCH TDRA configuration only includes one PDSCH time domain resource configuration. However, it is not limited to Default A, and may also be other predefined PDSCH TDRA tables).

TABLE 2-1

| RNTI | PDCCH search space | SS/PBCH block and CORESET multiplexing pattern | PDSCH-ConfigCommon includes pdsch-TimeDomainAllocationList | PDSCH-Config includes pdsch-TimeDomainAllocationList | PDSCH-Config includes pdsch-TimeDomainAllocationList ForMultiPDSCH | PDSCH time domain resource assignment to apply |
|---|---|---|---|---|---|---|
| C-RNTI, MCS-C-RNTI, CS-RNTI | Common search space associated with CORESET 0 | 1, 2, 3 | No | — | — | Default A |
| | | 1, 2, 3 | Yes | — | — | pdsch-TimeDomainAllocationList provided in PDSCH-ConfigCommon |
| C-RNTI, MCS-C-RNTI | Common search space that is not associated CORESET 0 UE-dedicated search space | 1, 2, 3 | No | No | No | Default A |
| | | 1, 2, 3 | Yes | No | No | pdsch-TimeDomainAllocationList provided in PDSCH-ConfigCommon |
| | | 1, 2, 3 | No/Yes | Yes | No | pdsch-TimeDomainAllocationList provided in PDSCH-Config |
| | | 1, 2, 3 | No/Yes | Yes | Yes | pdsch-TimeDomainAllocationList ForMultiPDSCH provided in PDSCH-Config |

TABLE 2-1-continued

| RNTI | PDCCH search space | SS/PBCH block and CORESET multiplexing pattern | PDSCH-ConfigCommon includes pdsch-TimeDomainAllocationList | PDSCH-Config includes pdsch-TimeDomainAllocationList | PDSCH-Config includes pdsch-TimeDomainAllocationListForMultiPDSCH | PDSCH time domain resource assignment to apply |
|---|---|---|---|---|---|---|
| | | 1, 2, 3 | Yes | No | Yes | pdsch-TimeDomainAllocationListForMultiPDSCH provided in PDSCH-Config |
| CS-RNTI | Common search space that is not associated CORESET 0 | 1, 2, 3 | No | No | No | Default A |
| | | 1, 2, 3 | Yes | No | No/Yes | pdsch-TimeDomainAllocationList provided in PDSCH-ConfigCommon |
| | UE-dedicated search space | 1, 2, 3 | No/Yes | Yes | No/Yes | pdsch-TimeDomainAllocationList provided in PDSCH-Config |

TABLE 2-2

| RNTI | PDCCH search space | SS/PBCH block and CORESET multiplexing pattern | PDSCH-ConfigCommon includes pdsch-TimeDomainAllocationList | PDSCH-Config includes pdsch-TimeDomainAllocationList | PDSCH-Config includes pdsch-TimeDomainAllocationListForMultiPDSCH | PDSCH time domain resource assignment to apply |
|---|---|---|---|---|---|---|
| C-RNTI, MCS-C-RNTI, CS-RNTI | Common search space associated with CORESET 0 | 1, 2, 3 | No | — | — | Default A |
| | | 1, 2, 3 | Yes | — | — | pdsch-TimeDomainAllocationList provided in PDSCH-ConfigCommon |
| C-RNTI, MCS-C-RNTI | Common search space that is not associated CORESET 0 | 1, 2, 3 | No | No | No | Default A |
| | | 1, 2, 3 | Yes | No | No | pdsch-TimeDomainAllocationList provided in PDSCH-ConfigCommon |
| | UE-dedicated search space | 1, 2, 3 | No/Yes | Yes | No | pdsch-TimeDomainAllocationList provided in PDSCH-Config |
| | | 1, 2, 3 | No/Yes | No/Yes | Yes | pdsch-TimeDomainAllocationListForMultiPDSCH provided in PDSCH-Config |
| CS-RNTI | Common search space that is not associated COREST 0 | 1, 2, 3 | No | No | No | Default A |
| | | 1, 2, 3 | Yes | No | No/Yes | pdsch-TimeDomainAllocationList provided in PDSCH-ConfigCommon |
| | UE-dedicated search space | 1, 2, 3 | No/Yes | Yes | No/Yes | pdsch-TimeDomainAllocationList provided in PDSCH-Config |
| | | 1, 2, 3 | No | No | Yes | Default A |

In some embodiments, the format of the DCI is DCI format 1_1 or DCI format 1_2, and the PDSCH time domain resource assignment table applied when the DCI is used for SPS activation and/or SPS retransmission (the CRC of the DCI is scrambled by a CS-RNTI) is different from the PDSCH time domain resource assignment table applied when the DCI is used for non-SPS activation and/or non-SPS retransmission (the CRC of the DCI is not scrambled by a CS-RNTI).

For example, when the DCI is used for SPS activation and/or SPS retransmission, the PDSCH time domain resource assignment table applied by the DCI is not the PDSCH TDRA table for supporting one DCI scheduling a plurality of PDSCHs. In other words, when the DCI is used for SPS activation and/or SPS retransmission, the PDSCH time domain resource assignment table applied by the DCI is the PDSCH TDRA table for only supporting one DCI scheduling one PDSCH; and when the DCI is used for non-SPS activation and/or non-SPS retransmission, the PDSCH time domain resource assignment table applied by the DCI is the PDSCH TDRA table for supporting one DCI scheduling a plurality of PDSCHs.

Or, in other words, when the DCI is used for SPS activation and/or SPS retransmission, the PDSCH time domain resource assignment table applied by the DCI is not the PDSCH time domain resource assignment table configured by the first indication information; and when the DCI is used for non-SPS activation and/or non-SPS retransmission, the PDSCH time domain resource assignment table applied by the DCI is the PDSCH time domain resource assignment table configured by the first RRC signaling.

In some embodiments, the first list is used to validate the PDSCH time domain resource assignment table applied by the DCI in the format of DCI format 1_1, and may also be used to validate the PDSCH time domain resource assignment table applied by the DCI in the format of DCI format 1_0. For example, the table in the previous example may be regarded as a first list obtained by combining the third list and the existing second table, and at the same time, it is used to validate the PDSCH time domain resource assignment table applied by the DCI in the formats of DCI format 1_1 and DCI format 1_0.

In some embodiments, the PDSCH TDRA table for supporting one DCI scheduling a plurality of PDSCHs is DCI format specific. For example, corresponding PDSCH TDRA tables for supporting one DCI scheduling a plurality of PDSCHs may be configured respectively for DCI format 1_1 and DCI format 1_2.

The PDSCH time domain resource assignment table is configured by the network device above via higher-layer signaling, and the PDSCH time domain resource assignment table supports one DCI scheduling a plurality of PDSCHs, hence, one DCI scheduling a plurality of PDSCHs is supported, thereby reducing a DCI monitoring burden on the terminal equipment, and reducing power consumption and complexity.

An NR system supports one DCI scheduling a plurality of PDSCHs; however, there is currently no specific solution for how to support one DCI scheduling a plurality of PDSCHs, and there is even no solution for supporting SPS activation when it supports one DCI scheduling a plurality of PDSCHs (such as how to determine hybrid automatic repeat request (HARQ) process ID and a time domain resource of an SPS PDSCH when DCI applying a PDSCH TDRA table for supporting one DCI scheduling a plurality of PDSCHs is used to activate SPS).

Following description shall be given with reference to an embodiment of a second aspect.

Embodiment of the Second Aspect

The embodiment of this disclosure provides a data scheduling method, which shall be described from a side of a terminal equipment.

Figure 3:
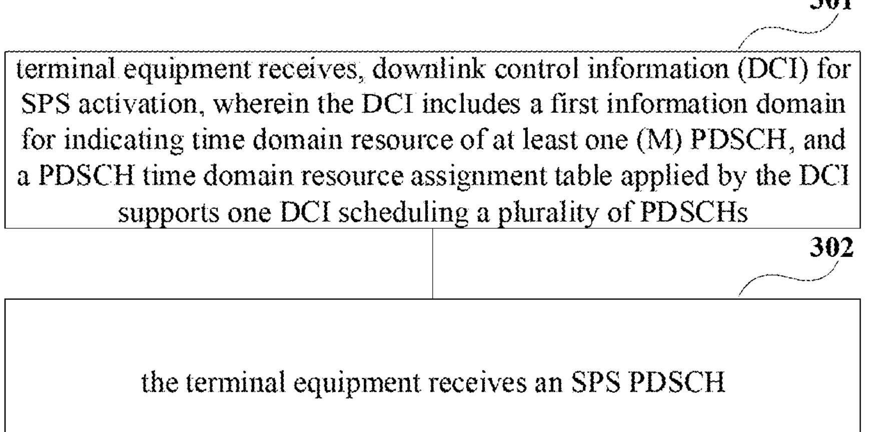
FIG. 3 is a schematic diagram of the data scheduling method of an embodiment of this disclosure.

FIG. 3 is a schematic diagram of the data scheduling method of the embodiment of this disclosure. As shown in FIG. 3, the method includes:

301: a terminal equipment receives, downlink control information (DCI) for SPS activation, wherein the DCI includes a first information field for indicating a time domain resource of at least one (M) PDSCH, and a PDSCH time domain resource assignment table applied by the DCI supports one DCI scheduling a plurality of PDSCHs; and

302: the terminal equipment receives an SPS PDSCH.

In existing techniques, only the PDSCH TDRA table for only supporting one DCI scheduling one PDSCH is supported. Therefore, a method for validating a hybrid automatic repeat request (HARQ) process ID and a time domain resource of an SPS PDSCH when the DCI applying the PDSCH TDRA table is used for SPS activation is provided only. In this disclosure, it is taken into account that NR supports one DCI scheduling a plurality of PDSCHs, NR may introduce a PDSCH TDRA table for supporting one DCI scheduling a plurality of PDSCHs (as described in the embodiment of the first aspect, for example, a first indication is introduced to configure the PDSCH TDRA table), the DCI applying the PDSCH TDRA table may also be used for SPS activation, and hybrid automatic repeat request (HARQ) process ID and the time domain resource of the SPS PDSCH may be validated according to the DCI, which shall be described below.

In some embodiments, in 301, use of the DCI for SPS activation needs to satisfy conditions as follows:

1) the CRC of the DCI is scrambled by the CS-RNTI;
2) a value of a new data indication field in the DCI is set to be 0; and
3) if the DCI includes an HARQ feedback timing indicator field (PDSCH-to-HARQ_feedback timing indicator field), the PDSCH-to-HARQ_feedback timing indicator field does not provide an inapplicable value from dl-DataToUL-ACK-r16. (The HARQ feedback timing field may not exist, and if it does not exist or dl-DataToUL-ACK-r16 does not include the inapplicable value, condition 3 does not need to be taken into account.)

In some embodiments, the inapplicable value in dl-DataToUL-ACK-r16 is, for example, −1. The terminal equipment is unable to determine the HARQ feedback timing corresponding to the PDSCH scheduled by the DCI directly according to the inapplicable value. (Generally, it is needed to be determined according to information in an other DCI after receiving the other DCI.)

In some embodiments, in 301, when the terminal equipment is provided with a single SPS configuration, use of the DCI for SPS activation needs further to satisfy conditions as follows: values of all bits of an HARQ process number field are 0 (i.e. the field is set to be all ‘0’s), and values of all bits of a redundancy version field (or all bits in a redundancy version field for an enabled TB when the format of the DCI is DCI format 1_1) are 0 (i.e. the field is set to be all ‘0’s).

When the terminal equipment is provided with a plurality of SPS configurations, use of the DCI for SPS activation needs further to satisfy the following: all bits of a redundancy version field (or all bits in a redundancy version field for an enabled TB when the format of the DCI is DCI format 1_1) are 0 (i.e. the field is set to be all ‘0’s).

In some embodiments, the DCI may include a first information field, the first information field may be a time domain resource assignment field, and indicates the PDSCH time domain resource (or DL assignment) by indicating an index (a row index, e.g. a value of the row index is greater than or equal to 1) to which the PDSCH TDRA configuration in the PDSCH TDRA table applied by the DCI corresponds, in other words, the DCI indicates the PDSCH time domain resource by indicating the PDSCH TDRA configuration in the PDSCH TDRA table it applies. For example, a value m (assuming that m is an integer greater than or equal to 0) of the first information field of the DCI correspondingly indicates a PDSCH TDRA configuration with an index m+1 (i.e. an (m+1)-th row) in the PDSCH TDRA table applied by the DCI. In the case where the PDSCH TDRA table is configured by the first indication information, for example, an index value to which an (m+1)-th PDSCH TDRA configuration configured by the first indication information corresponds is m+1, that is, when the value of the first information field is m, it corresponds to the (m+1)-th PDSCH TDRA configuration configured by the first RRC signaling.

In some embodiments, the number of the PDSCH time domain resources indicated by the DCI is equal to the number of the PDSCH time domain resource configurations included in the PDSCH TDRA configuration indicated by the DCI.

In some embodiments, the terminal equipment may determine time domain resources of the SPS PDSCH (including a slot where SPS PDSCH is located and symbol positions in the slot) according to the PDSCH TDRA configuration indicated by the DCI used for activating SPS and a periodicity configuration of the SPS activated by the DCI. For example, the terminal equipment determines SPS PDSCH time domain resources within one SPS periodicity according to the PDSCH time domain resource assignment configuration indicated by the DCI used for activating SPS, and determines SPS PDSCH time domain resources in different SPS periods according to a periodicity of the SPS. In 302, the SPS PDSCH is received at a corresponding time domain resource position. How to determine the time domain resources of the SPS PDSCH shall be described below first.

In some embodiments, when M=1, it means that the first information field in the DCI used for SPS activation only indicates one PDSCH time domain resource, in other words, the PDSCH TDRA configuration indicated by the first information field includes only one PDSCH time domain resource configuration. For example, the PDSCH time domain resource assignment configuration indicated by the first information field includes such information as a slot offset K0 between the PDSCH and the DCI, a symbol position in the slot (such as an SLIV), and a mapping type, etc. The terminal equipment may determine a slot where the first SPS PDSCH (assuming that it corresponds to an (N=0)-th DL assignment or SPS PDSCH in accordance with formula 1)) is located according to the PDSCH TDRA configuration (such as the slot offset between the PDSCH included in the PDSCH TDRA configuration and the DCI). Furthermore, the terminal equipment may determine a slot where an N-th SPS PDSCH (an N-th downlink assignment) is located according to an SPS periodicity periodicity configured in SPS configuration information SPS-Config. For example, the slot where the N-th SPS PDSCH (or the N-th downlink assignment) is located should satisfy formula 1) (i.e. the N-th SPS PDSCH is in a slot satisfying formula 1): (e.g. for a hyperframe HFN)

formula 1

$$(numberOfSlotsPerFrame \times SFN + \text{slot number in the frame}) = [(numberOfSlotsPerFrame \times SFN_{start\ time} + \text{slot}_{start\ time}) + N \times \text{periodicity} \times numberOfSlotsPerFrame / 10] \text{ modulo } (1024 \times numberOfSlotsPerFrame));$$

where, memberOfSlotsPerFrame is the number of slots included in a system frame, SFN and slot number in the frame at the left side of the formula are equivalent to an SFN of a system frame where the slot of the N-th (e.g. N>=0) SPS PDSCH is located and a slot number within the system frame, respectively, and SFNstart time and slotstart time are, for example, SFN of a system frame where the slot of the (N=0)-th SPS PDSCH is located and a slot number within the system frame, respectively (specifically, the (N=0)-th SPS PDSCH may also be regarded as a first SPS PDSCH). The (N=0)-th SPS PDSCH refers to, for example, a first SPS PDSCH after the DCI used to activate the SPS, that is, corresponding to the PDSCH of the PDSCH time domain resource indicated by the DCI (the PDSCH time domain resource indicated by the DCI refers to a PDSCH time domain resource determined only according to the time domain resource (e.g. a slot) where the DCI is located and the TDRA configuration indicated by the DCI rather than according to the periodicity configuration of the SPS). In addition, symbol positions of the SPS PDSCH in different slots are identical, that is, symbol positions (such as SLIVs) in slots included in the PDSCH TDRA configuration indicated by the DCI. In a case where corresponding pdsch-AggregationFactor (1/2/4/8) is configured (configured in the SPS configuration information SPS-Config or PDSCH configuration information PDSCH-Config), symbol assignments in consecutive pdsch-AggregationFactor slots are identical, and different RVs of the same TB may be transmitted in the pdsch-AggregationFactor slots. Reference may be made to existing techniques for the above method, which shall not be repeated herein any further.

Figure 4A:
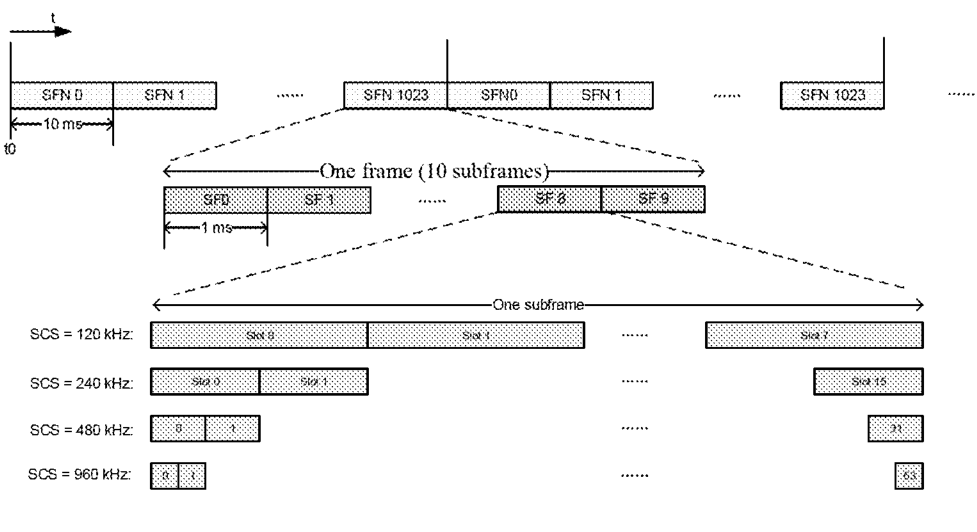
FIGS. 4A and 4B are schematic diagrams of a frame structure of an embodiment of this disclosure.
Figure 4B:
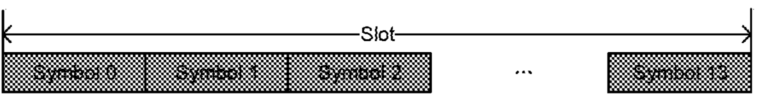

How to determine the time domain resources of the SPS PDSCH shall be further described below with reference to the accompanying drawings. FIGS. 4A and 4B show schematic diagrams of a frame structure. As shown in FIG. 4A, a relationship among a system frame (frame in brief), a subframe (SF) and a slot is that one frame includes 10 subframes, and the number of slots included in one subframe is related to a subcarrier spacing (SCS). As shown in FIG. 4B, one slot includes 14 symbols.

Figure 5A:
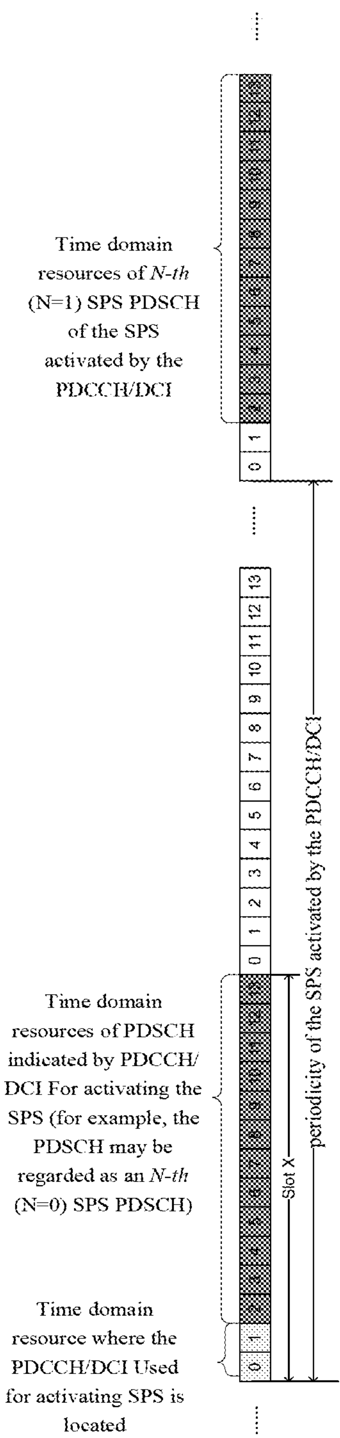
FIGS. 5A and 5B are schematic diagrams of validating time domain resources of an SPS PDSCH of an embodiment of this disclosure.
Figure 5B:
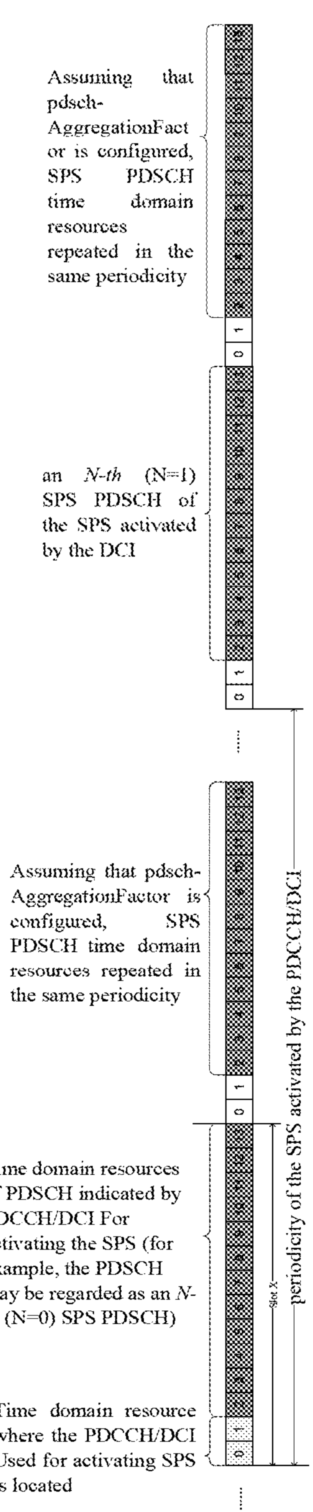

FIG. 5A is a schematic diagram of the time domain resources of the SPS PDSCH in this embodiment when the DCI indicates (or schedules) one PDSCH time domain resource and no pdsch-AggregationFactor is configured or configured pdsch-AggregationFactor=1. As shown in FIG. 5A, the DCI is transmitted at slot X. Assuming that according to the PDSCH TDRA configuration indicated by the DCI, time domain resources of the (N=0)-th SPS PDSCH (or the PDSCH indicated by the DCI) are symbols 2-13 (N=0) of slot X, time domain resources of the N-th SPS PDSCH are symbols 2-13 of a slot spaced apart from the slot where the (N=0)-th SPS PDSCH is located by N*SPS periods (ms) (that is, the slot where the N-th SPS PDSCH is located is spaced apart from (a starting position of) the slot where the (N=0)-th SPS PDSCH is located by N*SPS periods (ms)), and the symbol positions in the slot are identical to those in the slot where the (N=0)-th SPS PDSCH is located). FIG. 5B is a schematic diagram of the time domain resources of the SPS PDSCH in this embodiment when the DCI indicates (or schedules) one PDSCH time domain resource and configured pdsch-AggregationFactor=2. As shown in FIG. 5B, the DCI is transmitted at slot X, and assuming that according to the PDSCH TDRA configuration indicated by the DCI, time domain resources of the (N=0)-th SPS PDSCH (or the PDSCH indicated by the DCI) are symbols 2-13 of slot X, and as pdsch-AggregationFactor=2, time domain resources of the SPS PDSCH that repeat within slot X+1 are also symbols 2-13, that is, the time domain resources of the (N=0)-th SPS PDSCH include symbols 2-13 in slot X and slot X+1. The time domain resources of the N-th SPS PDSCH are similar to a configuration of symbols 2-13 of two slots spaced apart from the slots X and X+1 where the (N=0)-th SPS PDSCH is located by N*SPS periods (ms), the configuration of pdsch-AggregationFactor=4 or 8 is similar, which shall not be enumerated herein any further.

In this method, a difference from existing techniques is that the PDSCH TDRA configuration indicated by the first information field (e.g. corresponding to an (m+1)-th row in the PDSCH TDRA table) includes only one PDSCH time domain resource configuration, but the PDSCH TDRA table further includes at least one other PDSCH TDRA configuration, which includes at least two PDSCH time domain resource configurations.

In some embodiments, when M is greater than 1, the first information field in the DCI used for SPS activation indicates at least two PDSCH time domain resources, in other words, the PDSCH TDRA configuration indicated by the first information field includes at least two PDCSH time domain resource configurations. For example, the PDSCH time domain resource assignment configuration indicated by the first information field includes such information as a slot offset K0 between the PDSCH and the DCI, at least two symbol positions in slots (such as SLIVs), and a mapping type of the PDSCH, etc. At this moment, the terminal equipment may determine the time domain resources of the SPS PDSCH according to one of the at least two PDSCH time domain resources or according to the at least two PDSCH time domain resources, or in other words, the terminal equipment may determine the time domain resources of SPS PDSCH according to one of at least two symbol positions in slots in the PDSCH TDRA configuration.

For example, the time domain resources of the SPS PDSCH may be determined according to one of at least two PDSCH time domain resources, and the one PDSCH time domain resource may be a first or a last or other one of the at least two PDSCH time domain resources; however, the embodiment of this disclosure is not limited thereto. For example, the terminal equipment determines a slot where a first SPS PDSCH (a logical position or sequence of which is first)(assuming that it corresponds to an (N=0)-th DL assignment or SPS PDSCH in accordance with formula 1)(a serial number of which may be regarded as 0-th)) is located. The first SPS PDSCH, for example, corresponds to a first or last one of the at least two PDSCH time domain resources indicated by the DCI (however, it is not limited thereto), or corresponds to a first or last one of at least two symbol positions in the slots in the PDSCH TDRA configuration (however, it is not limited thereto), and thus, the terminal equipment may also determine a slot of an N-th SPS PDSCH (an N-th downlink assignment) in a subsequent periodicity according to such parameters configured in the SPS configuration information SPS-Config as a periodicity periodicity, etc. Reference may be made to the previous explanations when M=1 for determining the slot where the N-th SPS PDSCH (an N-th downlink assignment) is located by the terminal equipment according to the slot where the (N=0)-th SPS PDSCH is located and the SPS periodicity, which shall not be repeated herein any further. In addition, symbol positions of SPS PDSCHs at different slots are identical in the slots, i.e. the symbol positions (such as SLIVs) in the slots in the PDSCH TDRA configuration indicated by the DCI corresponding to the one PDSCH time domain resource (or the above first SPS PDSCH).

Figure 6A:
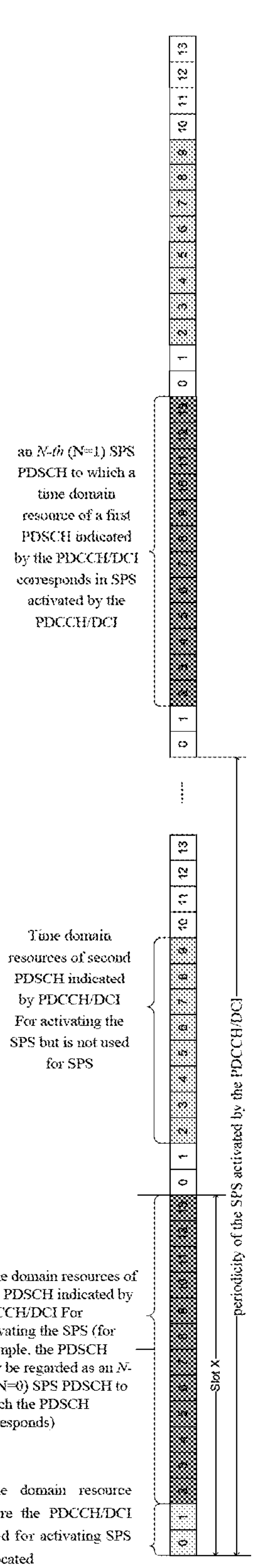
FIGS. 6A-6C are schematic diagrams of validating time domain resources of an SPS PDSCH of an embodiment of this disclosure.

FIG. 6A is a schematic diagram of time domain resources of the SPS PDSCH in this embodiment when the DCI indicates (or schedules) two PDSCH time domain resources and no pdsch-AggregationFactor is configured or configured pdsch-AggregationFactor=1 (wherein a first PDSCH time domain resource may be used for SPS and a second PDSCH time domain resource may not be used for SPS, that is, the time domain resources of the SPS PDSCH are determined according to the first PDSCH time domain resource indicated by the DCI). As shown in FIG. 6A, assuming that according to the PDSCH TDRA configuration indicated by the DCI, time domain resources of the (N=0)-th SPS PDSCH (or the first PDSCH indicated by the DCI) are symbols 2-13 (N=0) of slot X, time domain resources of the N-th SPS PDSCH are symbols 2-13 of a slot spaced apart from the slot where the (N=0)-th SPS PDSCH is located by N*SPS periods (ms)(that is, the slot where the N-th SPS PDSCH is located is spaced apart from (a starting position of) the slot where the (N=0)-th SPS PDSCH is located by N*SPS periods (ms)), and the symbol positions in the slot are identical to those in the slot where the (N=0)-th SPS PDSCH is located). Description in FIG. 6A is given by taking that the DCI indicates two PDSCH time domain resources and the two PDSCHs are in continuous slots as an example. The DCI may further schedule more than three PDSCH time domain resources, and a plurality of PDSCHs may also be not in continuous slots, which shall not be enumerated herein any further.

Figure 6B:
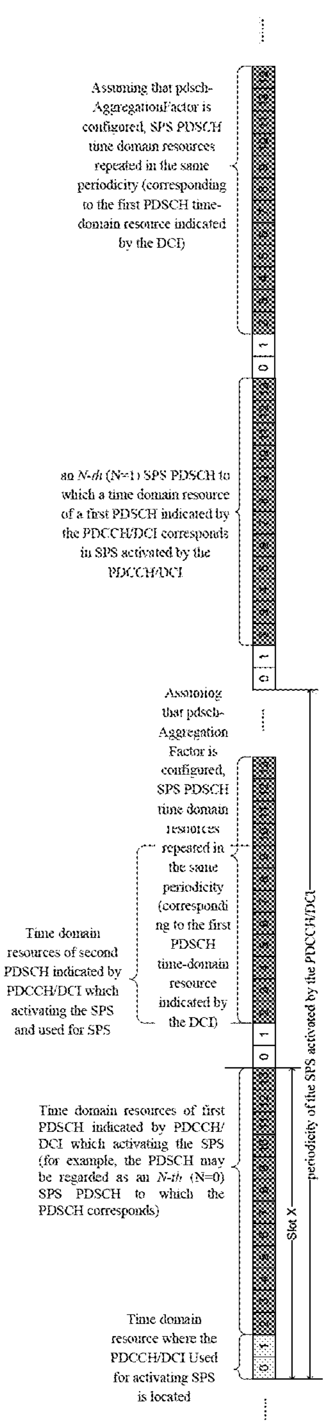

FIG. 6B is a schematic diagram of the time domain resources of SPS PDSCH in this embodiment when the DCI indicates two PDSCH time domain resources and configured pdsch-AggregationFactor-2. As shown in FIG. 6B, assuming that according to the PDSCH TDRA configuration indicated by the DCI, a first time domain resource indicated by the DCI is symbols 2-13 (N=0) of slot X, a second time domain resource indicated by the DCI is symbols 2-9 of slot X+1, the first time domain resource is used for SPS, and the second time domain resource is not used for SPS. Hence, as pdsch-AggregationFactor=2, the SPS PDSCH time-domain resources that repeat within slot X+1 are also symbols 2-13, that is, the time domain resources of the (N=0)-th SPS PDSCH include symbols 2-13 in slot X and slot X+1. The time domain resources of the N-th SPS PDSCH are similar to a configuration of symbols 2-13 of two slots spaced apart from the slots X and X+1 where the (N=0)-th SPS PDSCH is located by N*SPS periods (ms), the configuration of pdsch-AggregationFactor=4 or 8 is similar, which shall not be enumerated herein any further.

For example, the time domain resources of the SPS PDSCH may be determined according to all the at least two PDSCH time domain resources. The at least two PDSCH time domain resources may be regarded as different SPS PDSCHs corresponding to a periodicity. For example, for each PDSCH time domain resource in the at least two PDSCH time domain resources, a slot where a corresponding SPS PDSCH is located may be determined respectively by using such parameters as the configured SPS periodicity periodicity and formula 1), and furthermore, time domain resources of multiple SPS PDSCHs in different periods are determined. Differences from the explanations of formula 1) when M=1 exist in at least one of the following: 1) N denotes a sequence number of the SPS periodicity or a sequence number of an SPS PDSCH in the at least two PDSCH time domain resources corresponding to the same PDSCH time domain resource in the at least two PDSCH time domain resources; for example, N of the SPS PDSCHs corresponding to the at least two PDSCH resources included in the first periodicity is 0; 2) $SFN_{start\ time}$ and $slot_{start\ time}$ are SFN of a system frame and a slot number within the system frame where the slot of the (N=0)-th SPS PDSCH to which the first PDSCH time domain resource corresponds is located, respectively. SFN of a system frame and a slot number within the system frame where the slot of the (N=0)-th SPS PDSCH to which other PDSCH time domain resources correspond is located are determined according to a sequence number and/or a slot offset to the slot of the (N=0)-th SPS PDSCH to which the first PDSCH time domain resource corresponds. That is, according to the sequence numbers (N) of the PDSCH time domain resources in the at least two PDSCH resources and/or the slot offset between the slots where the PDSCH time domain resources are located, the terminal equipment may also determine that the slots where the SPS PDSCHs are located. The sequence numbers are arranged in an ascending order; however, this disclosure is not limited thereto.

In some embodiments, different SPS PDSCHs are used to transmit different TBs or identical TBs.

Figure 6C:
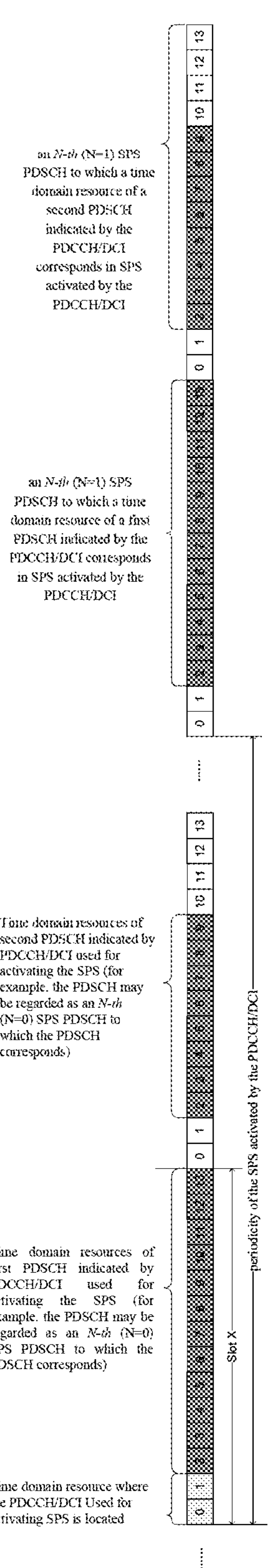

FIG. 6C is a schematic diagram of time domain resources of the SPS PDSCH in this embodiment when the DCI indicates two PDSCH time domain resources and no pdsch-AggregationFactor is configured or configured pdsch-AggregationFactor=1. As shown in FIG. 6C, assuming that according to the PDSCH TDRA configuration indicated by the DCI, the first PDSCH time domain resource indicated by the DCI is symbols 2-13 (N=0) of slot X, the second PDSCH time domain resource indicated by the DCI is symbols 2-9 (N=0) of slot X+1, the first time domain resource is used for SPS, and the second time domain resource is also used for SPS, that is, the time domain resource of the (N=0)-th SPS PDSCH includes the symbols 2-13 in slot X and the symbols 2-9 in slot X+1, the time domain resource of the N-th SPS PDSCH is symbols 2-13 and symbols 2-9 in two slots spaced apart from the slots where the (N=0)-th SPS PDSCH is located by N*SPS periods (ms) (that is, an interval between the slot where the N-th SPS PDSCH is located and (a starting position of) the slot where the (N=0)-th SPS PDSCH is located is N*SPS periods (ms), and symbol positions in the slots are identical to those of the (N=0)-th SPS PDSCH). Description in FIG. 6C is given by taking that the DCI indicates two PDSCH time domain resources and the two PDSCH time domain resources are in continuous slots as an example. The DCI may further schedule more than three PDSCH time domain resources, and a plurality of PDSCHs may also be not in continuous slots, which shall not be enumerated herein any further. In addition, in the case where pdsch-AggregationFactor is configured, a method for determining the time domain resources of SPS PDSCH is similar to that in FIG. 6B, and may be determined with reference to FIGS. 6B and 6C, which shall not be described herein any further.

It should be noted that time domain resources of a plurality of SPS PDSCHs in this disclosure may be SPS PDSCH time domain resources in different SPS periods, the number of PDSCHs in one SPS periodicity (which may also be regarded as one SPS PDSCH) is related to the number of PDSCH time domain resource configurations indicated by the DCI and a value of pdsch AggregationFactor, which are as described above, and shall not be repeated here any further.

In some embodiments, the method may further include: the terminal equipment validates an HARQ process identifier to which the SPS PDSCH time domain resource (or SPS PDSCH) corresponds.

In some embodiments, when M=1, that is, the first information field in the DCI for SPS activation indicates only one PDSCH time domain resource. In other words, the PDSCH TDRA configuration indicated by the first information field includes one PDSCH time domain resource configuration, and after determining the SPS PDSCH time domain resource according to the one PDSCH time domain resource configuration (however, it is not limited to this order), for example, the HARQ process identifier of SPS PDSCH is determined by using formulae 2) and 3) below.

formula 2

$$HARQ\ \text{Process}\ ID = [\text{floor}\ (\text{CURRENT\_slot}\times 10/(numberOfSlotsPerFrame\times \text{periodicity}))]\ \text{modulo}\ nrofHARQ\text{-}Processes),$$

formula 3

$$HARQ\ \text{Process}\ ID = [\text{floor}\ (\text{CURRENT\_slot}\times 10/(numberOfSlotsPerFrame\times \text{periodicity}))]\ \text{modulo}\ nrofHARQ\text{-}Processes + harq\text{-}ProcID\text{-}Offset);$$

where, CURRENT_slot is equal to [(SFN×memberOfSlotsPerFrame)+slot number in the frame], a meaning of memberOfSlotsPerFrame being as described above, nrofHARQ-Processes is the number of HARQ processes, and harq-ProcID-Offset is an HARQ process identifier offset (such as an offset relative to an HARQ process identifier 0), which is included in the SPS configuration information SPS-Config. For a case where harq-ProcID-Offset is not configured, an HARQ process identifier associated with a starting slot of downlink transmission may be determined by using formula 2), and for a case where harq-ProcID-Offset is configured, the HARQ process identifier associated with the starting slot of the downlink transmission may be determined by using formula 3).

Figure 7:
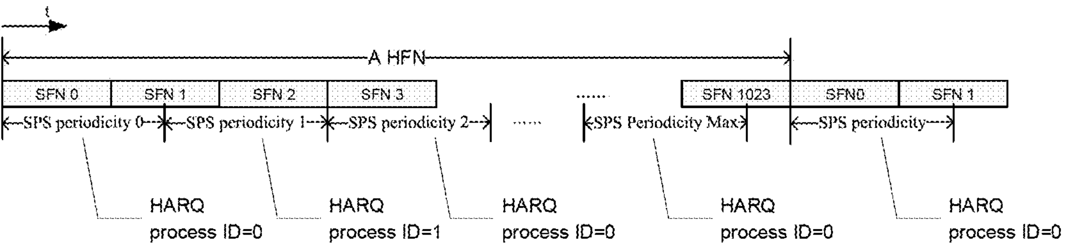
FIG. 7 is a schematic diagram of validating an HARQ process identifier of an embodiment of this disclosure.

FIG. 7 shows a schematic diagram of an HARQ process identifier to which the SPS PDSCH corresponds. As shown in FIG. 7, assuming that SPS periods in a hyperframe HFN are divided from a starting position of SFN 0, and the SPS periods are indexed from 0, in a case where nrofHARQ-Processes=2 and harq-ProcID-Offset is not configured, an HARQ process ID to which time domain resources in an SPS periodicity with an SPS periodicity index 1 corresponds is mod (SPS periodicity index 1, nrofHARQ-Processes).

FIG. 8 shows a schematic diagram of an HARQ process identifier to which the SPS PDSCH corresponds, wherein the first information field in the DCI used for SPS activation only indicates one PDSCH time domain resource. As shown in FIG. 8A, in a case where nrofHARQ-Processes=4 and harq-ProcID-Offset is not configured, the HARQ process ID is determined according to formula 2).

In some embodiments, when M is greater than 1, it means that the first information field in the DCI used for SPS activation indicates at least two PDSCH time domain resources. In other words, the PDSCH TDRA configuration indicated by the first information field is used to schedule at least two PDSCHs, a value of the first information field is m, and correspondingly indicating PDSCH TDRA configuration of an (m+1)-th row in the PDSCH TDRA table or an (m+1)-th PDSCH TDRA configuration configured by the first indication information includes at least two PDSCH time domain resource configurations. In determining the SPS PDSCH time domain resources according to one of the plurality of PDSCHs, HARQ process identifiers of the SPS PDSCH time domain resources may be determined by using formula 2) or 3). In determining the SPS PDSCH time domain resources according to the plurality of PDSCHs, for example, the plurality of PDSCHs are in one SPS periodicity, HARQ process identifiers to which the at least two PDSCH time domain resources correspond are identical or different, that is, HARQ process identifiers to which SPS PDSCH time domain resources transmitted in the same periodicity correspond are identical or different, and the terminal equipment may determine the HARQ process identifiers of the SPS PDSCHs according to the number of the at least two PDSCHs scheduled by the DCI (indicated by the first information field) and/or sequence numbers of the PDSCH time domain resources in the at least two PDSCH time domain resources scheduled by the DCI (indicated by the first information field), and the sequence numbers may be arranged in an ascending order, and this disclosure is not limited thereto. That is, the HARQ process identifiers of the SPS PDSCHs are also related to the number of the PDSCHs scheduled by the DCI and/or the sequence numbers of the PDSCH time domain resources in the at least two PDSCH time domain resources scheduled by the DCI, which shall be described below with reference to FIGS. 8B-8E.

Figure 8A:
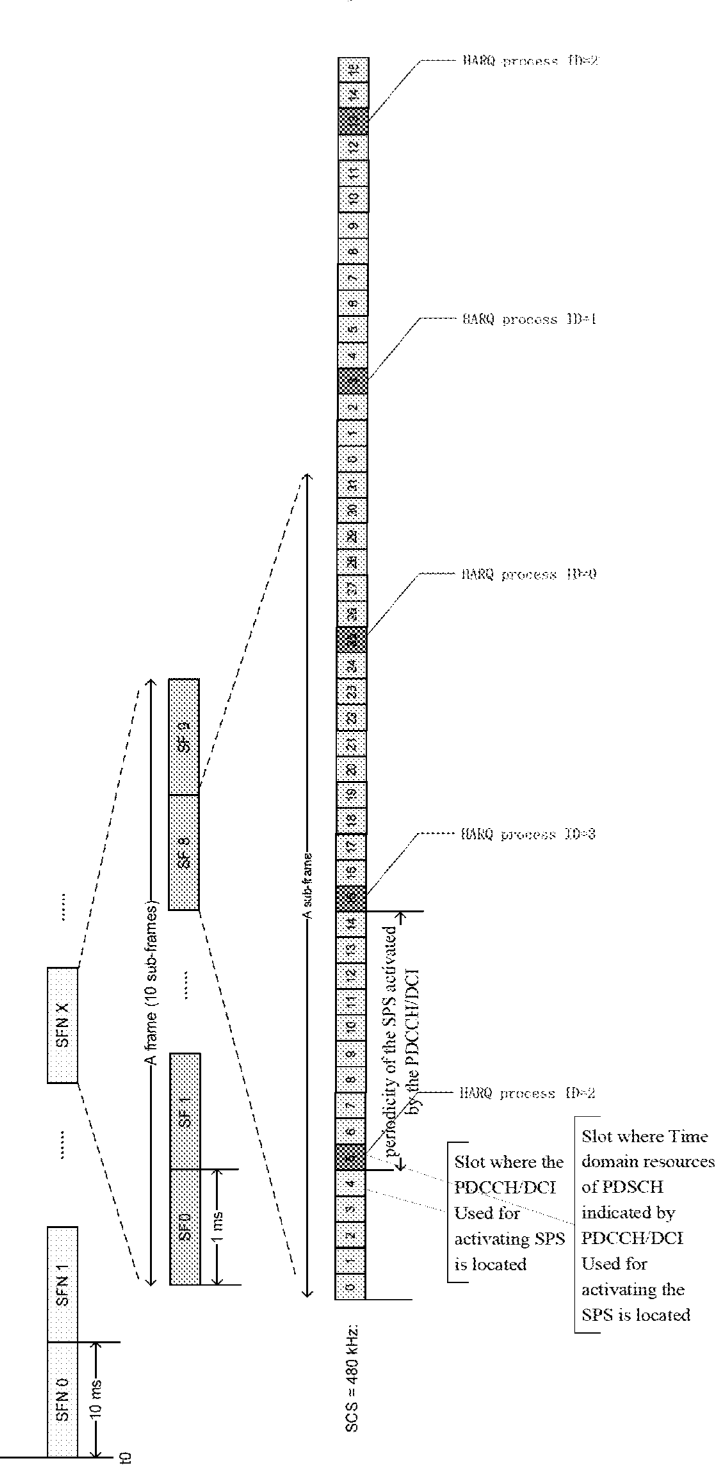
FIGS. 8A-8E are schematic diagrams of validating an HARQ process identifier of an embodiment of this disclosure.
Figure 8B:
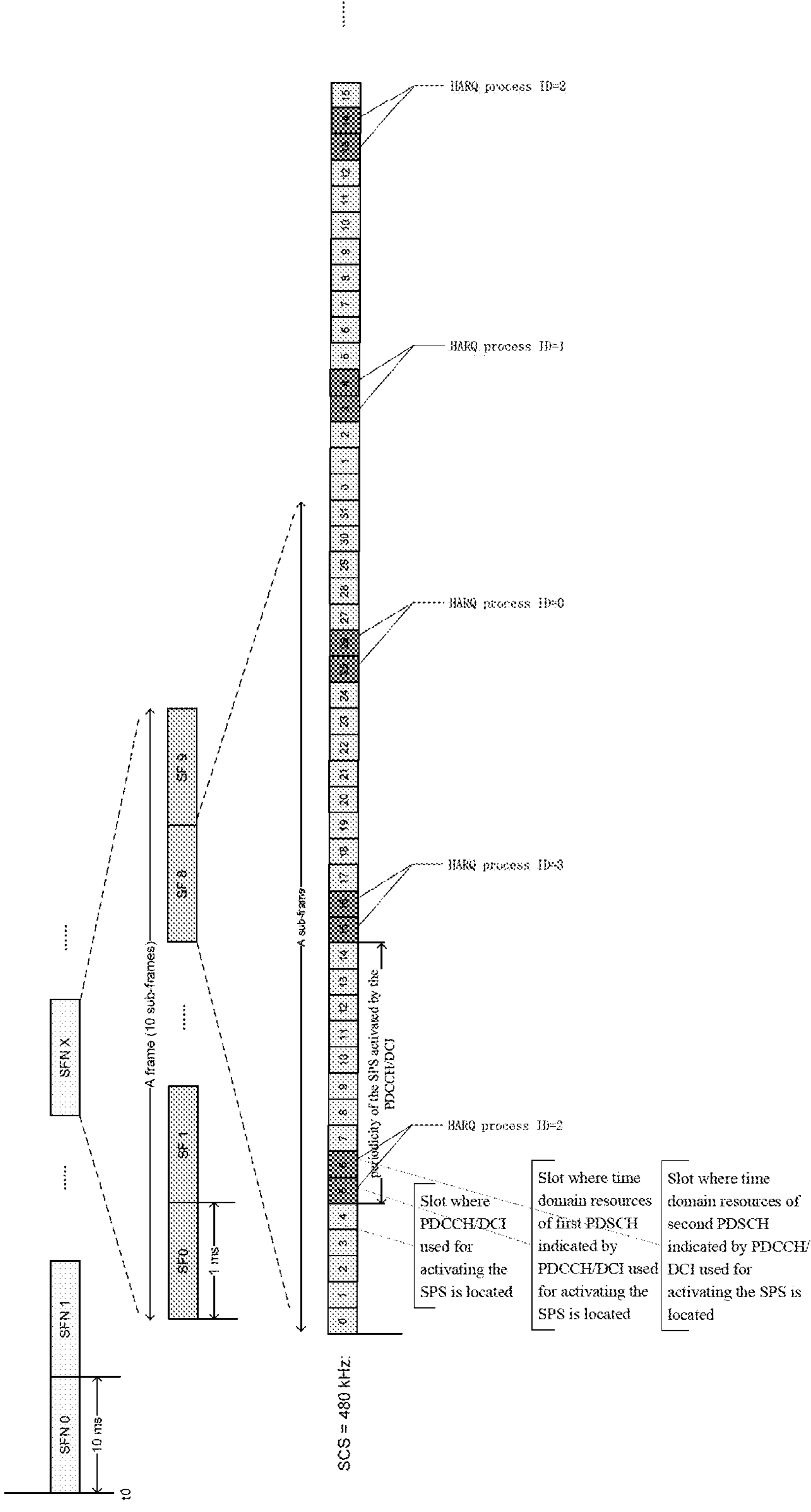

FIG. 8B shows a schematic diagram of an HARQ process identifier to which the SPS PDSCH corresponds. A difference from FIG. 8A exists in that as shown in FIG. 8B, the first information field in the DCI used for SPS activation indicates two PDSCH time domain resources, the two PDSCH time domain resources are in the same SPS periodicity, and HARQ process identifiers thereof are identical.

Figure 8C:
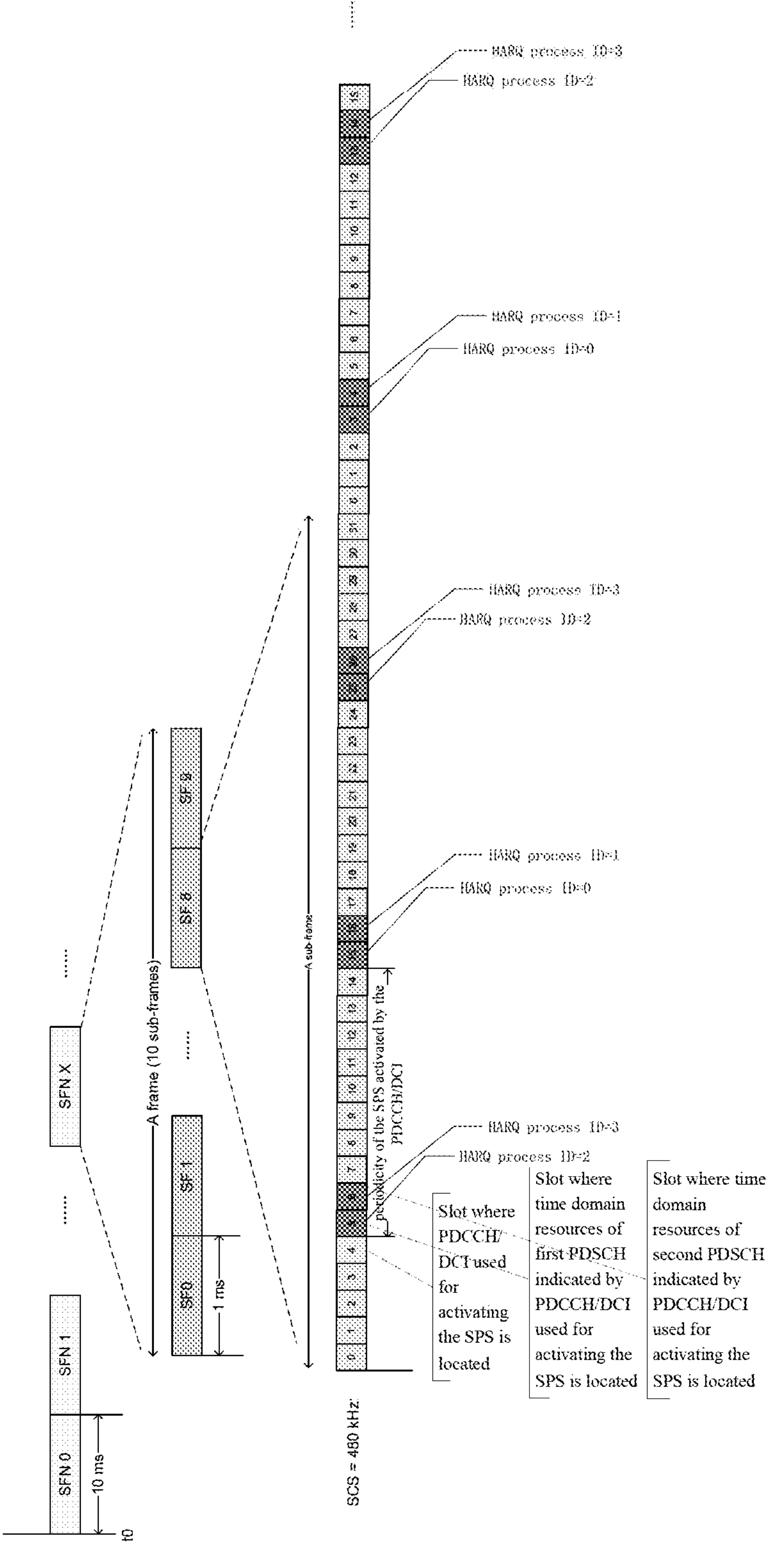

FIG. 8C shows a schematic diagram of an HARQ process identifier to which the SPS PDSCH corresponds. A difference from FIG. 8A exists in that as shown in FIG. 8C, the first information field in the DCI used for SPS activation indicates two PDSCH time domain resources (nrofHARQ-Processes=4>2), the two PDSCH time domain resources are in the same SPS periodicity, and HARQ process identifiers thereof are different.

Figure 8D:
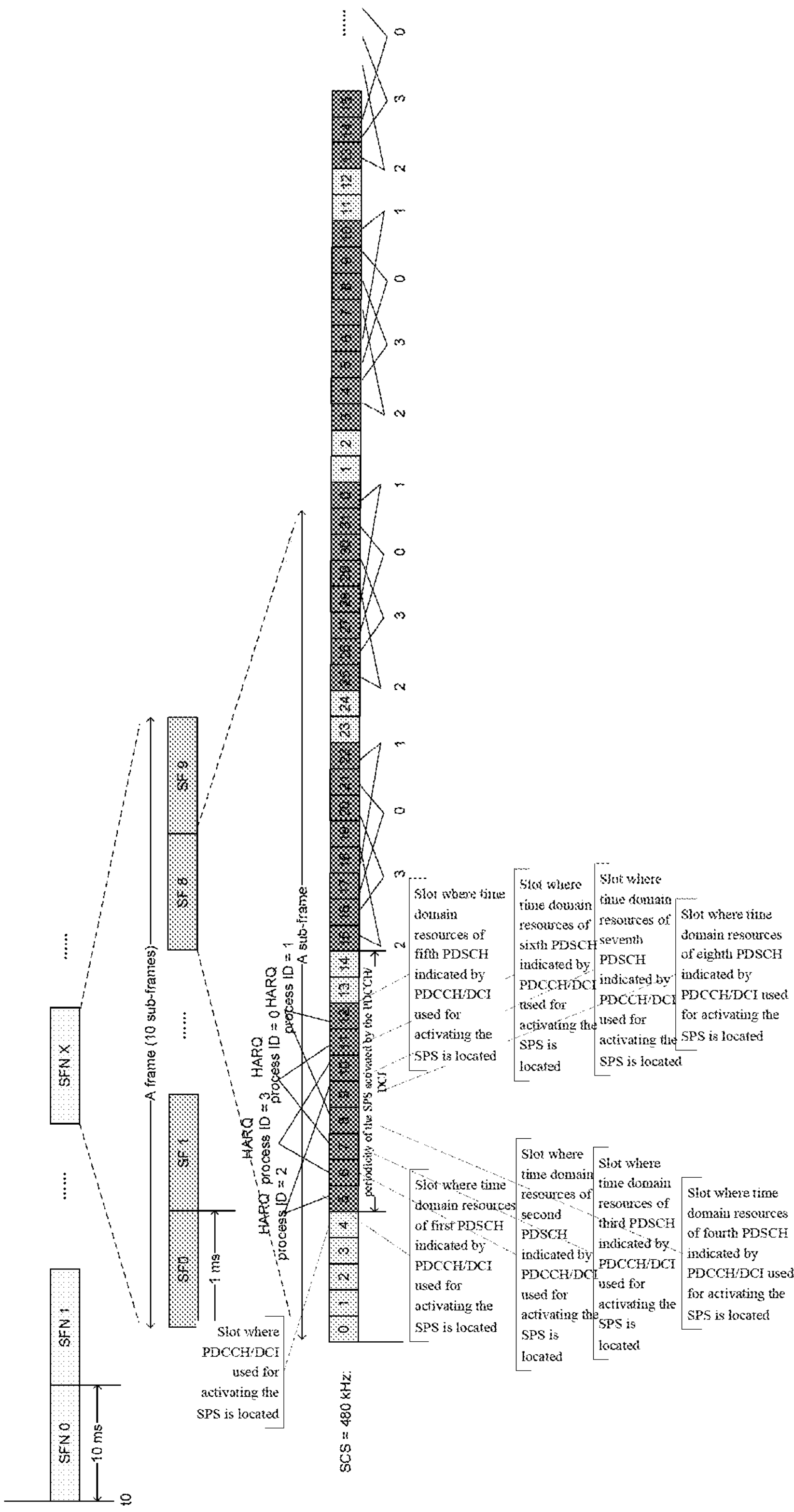

FIG. 8D shows a schematic diagram of an HARQ process identifier to which the SPS PDSCH corresponds. A difference from FIG. 8A exists in that as shown in FIG. 8D, the first information field in the DCI used for SPS activation indicates eight PDSCH time domain resources (nrofHARQ-Processes=4<8), the eight PDSCH time domain resources are in the same SPS periodicity, and HARQ process identifiers thereof are different.

Figure 8E:
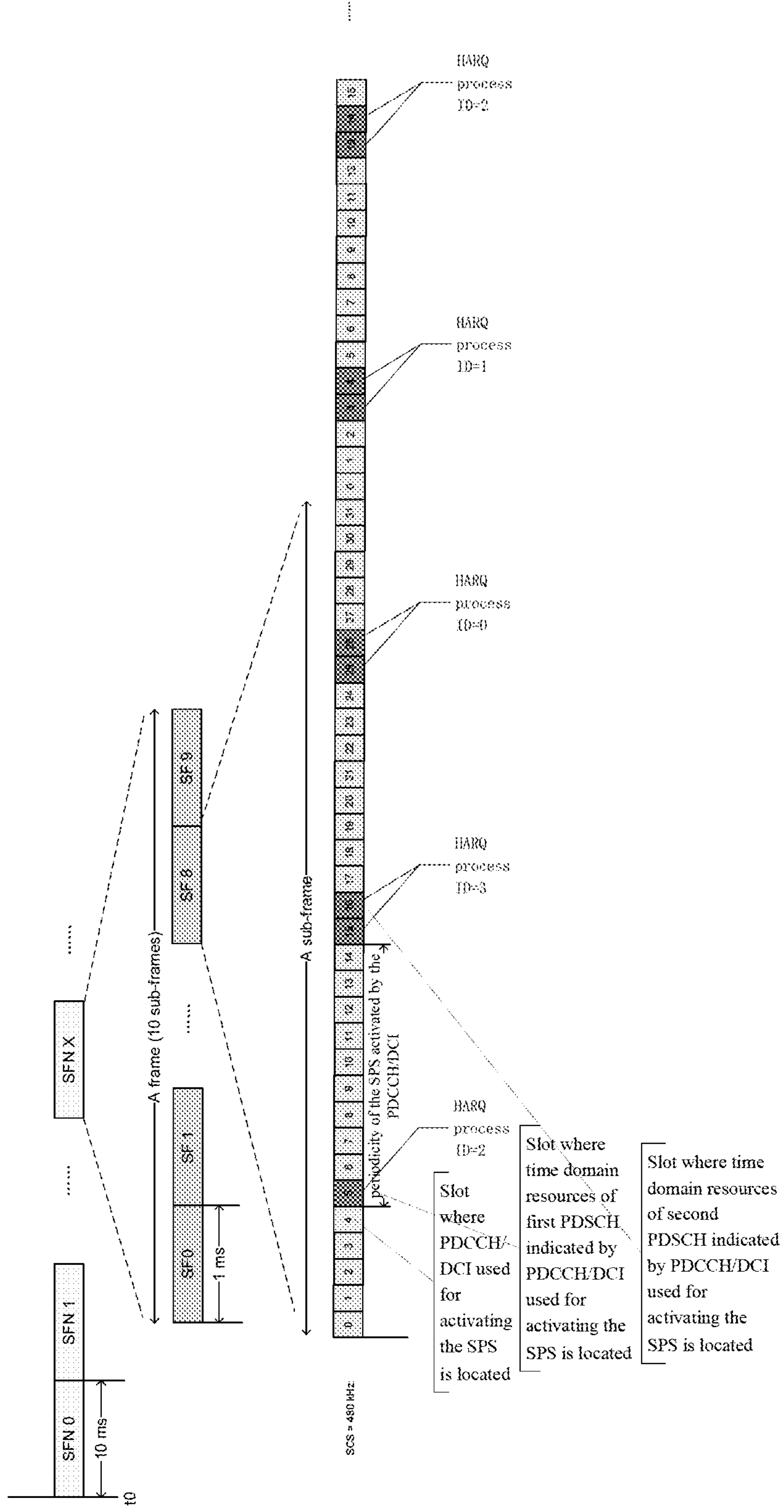

FIG. 8E shows a schematic diagram of an HARQ process identifier to which the SPS PDSCH corresponds. A difference from FIG. 8A exists in that as shown in FIG. 8D, the first information field in the DCI used for SPS activation indicates two PDSCH time domain resources (nrofHARQ-Processes=4>2), the two PDSCH time domain resources are not in the same SPS periodicity, and HARQ process identifiers in the same SPS periodicity are different.

In some embodiments, the UE needs to perform blind detection in receiving the PDCCHs. In order to reduce a complexity of the UE in receiving the PDCCHs and correctly understand information included in the DCI, this method may further include: the terminal equipment first determines a size (the number of bits) of the DCI and a size (the number of bits) of the first information field in the DCI. For example, when different PDSCH time domain resource assignment tables (such as Tables 2-1, 2-2 in the embodiment of the first aspect) are applied by the DCIs scrambled by using different RNTIs and the numbers of the PDSCH time domain resource assignment configurations (rows, indices, entries) contained in the different PDSCH time domain resource assignment tables are different, the number of bits included in the DCI and/or the number of bits of the first information field of the DCI may be determined according to the number of PDSCH time domain resource assignment configurations included in a PDSCH TDRA table containing a maximum number of PDSCH time domain resource assignment configurations (rows, indices, entries).

For example, when the number of PDSCH time domain resource assignment configurations included in the PDSCH TDRA table containing a maximum number of PDSCH time domain resource assignment configurations (rows, indices, entries) is I, the number of bits of the first information field is $\lceil \log_2(l) \rceil$, and the number of bits included in the DCI is determined accordingly. In addition, in order to make sizes of DCI in the same DCI format to be identical (so as to reduce a complexity of blind detection by the UE), when the number L of PDSCH time domain resource assignment configurations included in the PDSCH TDRA table applied by the DCI is less than I, $\lceil \log, (1) \rceil - \lceil \log, (L) \rceil$ padding bits are added after the first information field, and the padding bits are adjacent or not adjacent to the first information field. The UE, according to the PDSCH TDRA table applied by the received DCI, needs further to determine significant bits in the first information field in the DCI or significant values that the first information field is able to indicate.

In some embodiments, SPS PDSCHs corresponding to different HARQ process IDs are used to transmit different TBs.

In some embodiments, the method may further include (not shown, optional):

the terminal equipment receives, SPS configuration information (SPS Config) transmitted by a network device. The SPS configuration information includes the SPS periodicity periodicity and the number pdsch-AggregationFactor of times of repetition of PDSCHs as described above; wherein, nrofHARQ-Processes is the number of the HARQ processes, and harq-ProcID-Offset is an offset between the HARQ process identifiers. Furthermore, other SPS configurations may be included, and reference may be made to existing techniques for details, which shall not be repeated herein any further.

In some embodiments, when the SCS is 480 kHz or 960 kHz, the SPS configuration information is further used to directly indicate an SPS periodicity when the SCS is 480 kHz or 960 kHz, or according to an SCS different from the SCS, indicate an SPS periodicity to which the SCS corresponds, such as indicating the SPS periodicity when the SCS is 480 kHz or 960 kHz based on a reference SCS (e.g. 120 kHz), and the terminal equipment further determines the SPS periodicity according to an SCS different from the SCS.

It can be seen from the above embodiment that when one DCI schedules a plurality of PDSCHs, the SPS may be activated by using the DCI applying the PDSCH TDRA table supporting one DCI scheduling a plurality of PDSCHs. Therefore, when one DCI schedules a plurality of PDSCHs, the DCI may also be used for SPS activation, or in other words, when the DCI is used for SPS activation, it may also schedule a plurality of PDSCHs; in addition, the time domain resources or HARQ process IDs of the SPS PDSCHs may also be determined.

At present, an NR system supports one DCI scheduling a plurality of PDSCHs; however, there is currently no solution for how to support SPS activation/retransmission in a case where one DCI scheduling a plurality of PDSCHs is supported.

Following description shall be given with reference to an embodiment of a third aspect.

Embodiment of the Third Aspect

FIG. 9 is a schematic diagram of a data scheduling method of the embodiment of this disclosure. As shown in FIG. 9, the method includes:

901: a terminal equipment receives downlink control information (DCI), the DCI including a first information field for indicating time domain resource of at least one (M) PDSCH; and

902: the terminal equipment validates that the DCI is used for semi-persistent scheduling (SPS) activation or is not used for SPS activation according to a first information field of the DCI and/or according to a PDSCH time domain resource assignment table applied by the DCI and/or a format of the DCI.

In some embodiments, the DCI may include the first information field, the first information field being a time domain resource assignment field. The first information field indicates the scheduled PDSCH time domain resource by indicating an index (a row index, e.g. a value of the row index is greater than or equal to 1) to which the PDSCH TDRA configuration in the PDSCH TDRA table applied by the DCI corresponds. In other words, the DCI schedules the PDSCHs by indicating the PDSCH TDRA configuration in the PDSCH TDRA table it applies. For example, a value m of the first information field of the DCI (assuming that m is an integer greater than or equal to 0) correspondingly indicates a PDSCH TDRA configuration with an index m+1 (i.e. an (m+1)-th row) in the PDSCH TDRA table applied by the DCI. In a case where the PDSCH TDRA table is configured by the first indication information, for example, the value of the index to which an (m+1)-th PDSCH TDRA configuration configured by the first indication information corresponds is m+1, that is, when the value of the first information field is m, it corresponds to an (m+1)-th PDSCH TDRA configuration configured by the first RRC signaling.

In some embodiments, reference may be made to the embodiments of the first and second aspects for a meaning of the PDSCH TDRA table applied by the DCI and how to determine the applied PDSCH TDRA table, which shall not be repeated herein any further.

In some embodiments, in existing methods, use of the DCI for SPS activation needs to satisfy some conditions, and reference may be made the embodiment of the second aspect for details.

In some embodiments, according to existing methods, the UE further determines/validates whether the DCI is used for SPS activation (or, in other words, determines validation of the DCI used for SPS activation) when the DCI satisfies conditions as follows:

1) CRC of the DCI is scrambled by a CS-RNTI;

2) a value of a new data indication field in the DCI is set to be 0; and 3) if the DCI includes a HARQ feedback timing PDSCH-to-HARQ_feedback timing indicator field, the PDSCH-to-HARQ_feedback timing indicator field does not provide an inapplicable value from dl-DataToUL-ACK-r16. (The HARQ feedback timing field may not exist, and if it does not exist or dl-DataToUL-ACK-r16 does not include the inapplicable value, condition 3 does not need to be taken into account.)

In some embodiments, the inapplicable value in dl-DataTolL-ACK-r16 is, for example, −1. The terminal equipment is unable to determine the HARQ feedback timing corresponding to the PDSCH scheduled by the DCI directly according to the inapplicable value. (Generally, it is needed to be determined according to information in an other DCI after receiving the other DCI.)

In some embodiments, according to existing methods, if the DCI satisfies conditions 1)-3), if the following conditions are satisfied, the UE determines that the DCI is used for SPS activation, and further determines the time domain resources and HARQ process IDs of the SPS PDSCHs according to SPS configuration, and if the following conditions are not satisfied, the UE may drop all information in the DCI.

4) values of all bits of an HARQ process number field are 0 (i.e. the field is set to be all '0's) when the terminal equipment is provided with a single SPS configuration, and values of all bits of a redundancy version field (or all bits in a redundancy version field for an enabled TB when the format of the DCI is DCI format 1_1) are 0 (i.e. the field is set to be all '0's). When the terminal equipment is provided with a plurality of SPS configurations, when all bits of a redundancy version field of the DCI (or all bits in a redundancy version field for an enabled TB when the format of the DCI is DCI format 1_1) are 0 (i.e. the field is set to be all '0's).

In the embodiment of this disclosure, a difference from an existing method exists that on the basis of considering conditions 1)-4) or not considering conditions 1)-4), the terminal equipment needs further to validate whether the DCI is used for semi-persistent scheduling (SPS) activation or is not used for SPS activation according to the first information field of the DCI and/or according to the PDSCH time domain resource assignment table applied by the DCI and/or the format of the DCI. A principle of consideration is that when the DCI may be used for SPS activation, scheduling a plurality of PDSCHs by one DCI is avoided.

For example, in determining whether the DCI satisfies conditions 1)-3), the UE may validate that the DCI is used for semi-persistent scheduling (SPS) activation or is not used for SPS activation according to the first information field of the DCI and/or according to the PDSCH time domain resource assignment table applied by the DCI and/or the format of the DCI, and when the DCI satisfies a condition that the DCI is used for semi-persistent scheduling, whether the DCI is used for SPS activation is determined according to condition 4).

For example, the UE determines whether the DCI satisfies conditions 1)-3), if the DCI satisfies conditions 1)-3), determines whether it satisfies condition 4), and at the same time, validates that the DCI is used for semi-persistent scheduling (SPS) activation or is not used for semi-persistent scheduling (SPS) activation according to the first information field of the DCI and/or according to the PDSCH time domain resource assignment table applied by the DCI and/or the format of the DCI.

In some embodiments, that the DCI is used for semi-persistent scheduling (SPS) activation or is not used for semi-persistent scheduling (SPS) activation may be determined according to the PDSCH time domain resource assignment table applied by the DCI, that is, whether the DCI is used for semi-persistent scheduling (SPS) activation is determined according to whether the PDSCH time domain resource assignment table applied by the DCI supports one DCI scheduling a plurality of PDSCHs (or in other words, whether the PDSCH time domain resource assignment table applied by the DCI is a PDSCH time domain resource assignment table for supporting one DCI scheduling a plurality of PDSCHs); for example, when the PDSCH time domain resource assignment table applied by the DCI supports one DCI scheduling a plurality of PDSCHs, the DCI (even if it satisfies conditions 1)-4) or does not satisfy conditions 1)-4)) is not to be used for SPS activation, or, in other words, without needing to consider conditions 1)-4), when the PDSCH time domain resource assignment table applied by the DCI supports one DCI scheduling a plurality of PDSCHs, the DCI is not to be used for SPS activation; that is, when the DCI is used for SPS activation, the PDSCH time domain resource assignment table applied by the DCI only supports one DCI scheduling one PDSCH, or, in other words, when the DCI is used for SPS activation, conditions 1)-4) need to be satisfied, and the PDSCH time domain resource assignment table applied by the DCI only supports one DCI scheduling one PDSCH, or in other words, when the DCI satisfies conditions 1)-4) and the PDSCH time domain resource assignment table applied by the DCI only supports one DCI scheduling one PDSCH, the DCI is used for SPS activation.

In some embodiments, assuming that the PDSCH TDRA table applied by the DCI format 1_1 or DCI format 1_2 is independent of an RNTI, that is, regardless of which RNTI is used, the applied TDRA tables are identical (such as Table 1 in the embodiment of the first aspect). In the case where the PDSCH TDRA table for supporting one DCI scheduling a plurality of PDSCHs is configured, the DCI applies the PDSCH TDRA table for supporting one DCI scheduling a plurality of PDSCHs, and that the DCI is used for semi-persistent scheduling (SPS) activation or is not used for semi-persistent scheduling (SPS) activation may be determined according to the DCI format. For example, in a case where the PDSCH TDRA table for supporting one DCI (to which DCI format 1_1 and/or DCI format 1_2 corresponds) scheduling a plurality of PDSCHs is configured, when the format of the DCI is DCI format 1_1 or DCI format 1_2, the DCI (even if the DCI satisfies conditions 1)-4) or does not satisfy conditions 1)-4)) is not to be used for SPS activation, or in other words, conditions 1)-4) do not need to be considered. When a format applied by the DCI is DCI format 1_1 or DCI format 1_2, the DCI is not to be used for SPS activation; in other words, when the DCI is used for SPS activation, the format of the DCI is not DCI format 1_1 or DCI format 1_2, wherein the PDSCH time domain resource assignment table applied by DCI format 1_1 or DCI format 1_2 supports one DCI scheduling a plurality of PDSCHs, or in other words, when the DCI is used for SPS activation, conditions 1)-4) need to be satisfied, and the format of the DCI is not DCI format 1_1 or DCI format 1_2, or, in other words, the DCI satisfies conditions 1)-4), and when the format of the DCI is not DCI format 1_1 or DCI format 1_2, the DCI is used for SPS activation. Hence, one DCI scheduling a plurality of PDSCHs when the DCI is used for SPS activation may be avoided.

In some embodiments, when the PDSCH time domain resource assignment table applied by the DCI supports one DCI scheduling a plurality of PDSCHs (refer to the embodiment of the second aspect for specific meanings), the terminal equipment needs further to determine whether the DCI may be used for semi-persistent SPS activation according to the PDSCH time domain resources indicated by the first information field. In order to avoid scheduling a plurality PDSCHs by the DCI when the DCI is used for SPS activation, the DCI may be used for SPS activation when it is only used to schedule one PDSCH. In other words, when the DCI is used for SPS activation, the number of the PDSCH time domain resources indicated by the first information field is not greater than 1, and when the number of the PDSCH time domain resources indicated by the first information field is greater than 1, the DCI is not to be used for SPS activation. For example, when the DCI satisfies conditions 1)-4), the value of the first information field is m, which correspondingly indicates that an (m+1)-th row of PDSCH TDRA configuration in the PDSCH TDRA table or that an (m+1)-th PDSCH TDRA configuration configured by the RRC signaling includes only one PDSCH time domain resource configuration, and the DCI may be used for SPS activation; otherwise, when an (m+1)-th row of PDSCH TDRA configuration in the PDSCH TDRA table or that an (m+1)-th PDSCH TDRA configuration configured by the first indication information corresponding indicated includes only a plurality of PDSCH time domain resource configurations, the DCI is not to be used for SPS activation.

The above implementations for validating whether the DCI is used for SPS activation may be executed separately or in a combined manner, and the embodiment of this disclosure is not limited thereto. For example, whether the DCI is used for SPS activation may be determined first according to the DCI format, then according to the TDRA table applied by the DCI and finally according to the first information field. When the format of the DCI is DCI format 1_0, the DCI is not to be used for SPS activation, and when the format of the DCI is DCI format 1_1 or DCI format 1_2, whether the PDSCH TDRA table applied by the DCI supports one DCI scheduling a plurality of PDSCHs is determined, if not supported, whether the DCI is able to be used for SPS activation is validated further according to conditions 1)-4), and if supported, the number of PDSCH time domain resources indicated by the first information field of the DCI is taken into account, when the number is not greater than 1, whether the DCI is able to be used for SPS activation is validated further according to conditions 1)-4), and when the number is greater than 1, the DCI is not to be used for SPS activation. What described above is illustrative only; however, the embodiment of this disclosure is not limited thereto. For example, when the format of the DCI is DCI format 1_1 or DCI format 1_2, whether the PDSCH TDRA table applied by the DCI scrambled by using the CS-RNTI supports one DCI scheduling a plurality of PDSCHs may only be determined. A specific method is as described above, which shall not be enumerated herein any further.

In some embodiments, the UE needs to perform blind detection in receiving the PDCCHs. In order to reduce a complexity of the UE in receiving the PDCCHs and correctly understand information included in the DCI, this method may further include: the terminal equipment first determines a size (the number of bits) of the DCI and a size (the number of bits) of the first information field in the DCI. For example, when different PDSCH time domain resource assignment tables (such as Tables 2-1, 2-2 in the embodiment of the first aspect) are applied by the DCIs scrambled by using different RNTIs and the numbers of the PDSCH time domain resource assignment configurations (rows, indices, entries) contained in the different PDSCH time domain resource assignment tables are different, the number of bits included in the DCI and/or the number of bits of the first information field of the DCI may be determined according to the number of PDSCH time domain resource assignment configurations included in a PDSCH TDRA table containing a maximum number of PDSCH time domain resource assignment configurations (rows, indices, entries).

For example, when the number of PDSCH time domain resource assignment configurations included in the PDSCH TDRA table containing a maximum number of PDSCH time domain resource assignment configurations (rows, indices, entries) is I, the number of bits of the first information field is $\lceil \log_2(I) \rceil$, and the number of bits included in the DCI is determined accordingly. In addition, in order to make sizes of DCI in the same DCI format to be identical (so as to reduce a complexity of blind detection by the UE), when the number L of PDSCH time domain resource assignment configurations included in the PDSCH TDRA table applied by the DCI is less than I, $\lceil \log_2(I) \rceil - \lceil \log_2(L) \rceil$ padding bits are added after the first information field, and the padding bits are adjacent or not adjacent to the first information field. The UE, according to the PDSCH TDRA table applied by the received DCI, needs further to determine significant bits in the first information field in the DCI or significant values that the first information field is able to indicate.

In some embodiments, the method may further include (not shown, optional):

the terminal equipment receives, SPS configuration information (SPS Config) transmitted by a network device. The SPS configuration information includes the SPS periodicity periodicity and the number pdsch-AggregationFactor of times of repetition of PDSCHs as described above; where, nrofHARQ-Processes is the number of the HARQ processes, and harq-ProcID)-Offset is an offset between the HARQ process identifiers. Furthermore, other SPS configurations may be included, and reference may be made to existing techniques for details, which shall not be repeated herein any further.

In some embodiments, when the SCS is 480 kHz or 960 kHz, the SPS configuration information is further used to directly indicate an SPS periodicity when the SCS is 480 kHz or 960 kHz, or based on an SCS different from the SCS, indicate an SPS periodicity to which the SCS corresponds, such as indicating the SPS periodicity when the SCS is 480 kHz or 960 kHz based on a reference SCS (e.g. 120 kHz), and the terminal equipment further determines the SPS periodicity according to an SCS different from the SCS.

It can be seen from the above embodiment that when the PDSCH time domain resource assignment table supports one DCI scheduling a plurality of PDSCHs, that the DCI is used for semi-persistent scheduling (SPS) activation or is not used for semi-persistent scheduling (SPS) activation may be validated according to the first information field and/or the PDSCH time domain resource assignment table applied by the DCI and/or the DCI format, so as to avoid scheduling a plurality of PDSCHs when the DCI is used for SPS activation.

In the embodiments of this disclosure, the embodiments of the first, second and third aspects may be implemented separately or in a combined manner, and the embodiments of this disclosure are not limited thereto.

Embodiment of a Fourth Aspect

The embodiment of this disclosure provides a data transmitting method, which shall be described from a side of a network device, with parts repeated with those in the embodiments of the first to third aspects being not going to be described herein any further.

FIG. 10 is a schematic diagram of the data transmitting method of the embodiment of this disclosure. As shown in FIG. 10, the method includes:

1001: a network device transmits downlink control information (DCI) to a terminal equipment, the DCI including a first information field for indicating time domain resource of at least one (M) PDSCH, wherein that the DCI is used for semi-persistent scheduling (SPS) activation or is not used for SPS activation depends on the first information field and/or a PDSCH time domain resource assignment table applied by the DCI and/or a format of the DCI, or a network device transmits semi-persistent scheduling (SPS) configuration information to a terminal equipment, the SPS configuration information including an SPS periodicity, and an SCS of a DL BWP to which the SPS configuration corresponds being used to determine an SPS periodicity configured by the SPS configuration information, when the SCS is 480 kHz or 960 kHz, an SCS different from the SCS is used to determine the SPS periodicity; or, a network device transmits first indication information for configuring a PDSCH time domain resource assignment table applied by the DCI to a terminal equipment, wherein the PDSCH time domain resource assignment table applied by the DCI supports one DCI scheduling a plurality of PDSCHs; or, a network device transmits downlink control information (DCI) for SPS activation to a terminal equipment, the DCI including a first information field for indicating time domain resource of at least one (M) PDSCH, and a PDSCH time domain resource assignment table applied by the DCI supporting one DCI scheduling a plurality of PDSCHs.

In some embodiments, reference may be made to the embodiment of the first or the second or the third aspect for an implementation of 501, and repeated parts shall not be described herein any further.

Embodiment of a Fifth Aspect

The embodiment of this disclosure provides a data scheduling apparatus. The apparatus may be, for example, a terminal equipment, or may be one or more components or assemblies configured in a terminal equipment. Contents in this embodiment identical to those in the embodiment of the first aspect shall not be described herein any further.

Figure 11:
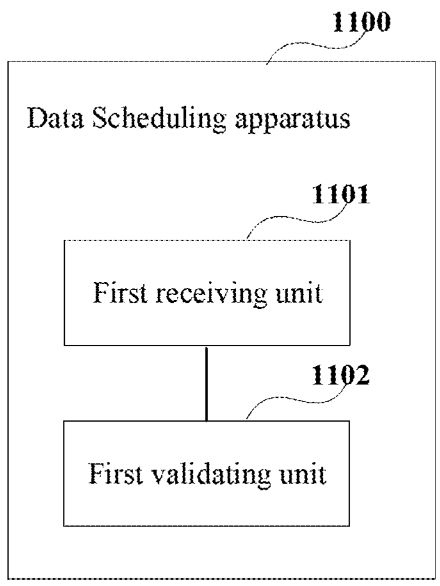
FIG. 11 is a schematic diagram of the data scheduling apparatus of an embodiment of this disclosure.

FIG. 11 is a schematic diagram of the data scheduling apparatus of the embodiment of this disclosure. As shown in FIG. 11, the apparatus includes:

a first receiving unit 1101 configured to receive downlink control information (DCI) for scheduling a physical downlink shared channel (PDSCH), the DCI including a first information field for indicating time domain resource of at least one (M) PDSCH; and a first validating unit 1102 configured to validate that the DCI is used for semi-persistent scheduling (SPS) activation or is not used for SPS activation according to the first information field and/or according to a PDSCH time domain resource assignment table applied by the DCI and/or a format of the DCI.

In some embodiments, when the DCI is used for SPS activation, the number of PDSCH time domain resources indicated by the first information field is not larger than 1 (M=1).

In some embodiments, the PDSCH time domain resource assignment table applied by the DCI supports one DCI scheduling a plurality of PDSCHs.

In some embodiments, when the DCI is scrambled by a CS-RNTI, the PDSCH time domain resource assignment table applied by the DCI does not support one DCI scheduling a plurality of PDSCHs, and when the DCI is scrambled by a non-CS-RNTI (a C-RNTI or an MCS-C-RNTI), the PDSCH time domain resource assignment table applied by the DCI supports one DCI scheduling a plurality of PDSCHs.

In some embodiments, a format of the DCI is DCI format 1_1 or DCI format 1_2.

In some embodiments, when the DCI is used for SPS activation, the PDSCH time domain resource assignment table applied by the DCI does not support one DCI scheduling a plurality of PDSCHs.

In some embodiments, when the DCI is used for SPS activation, the format of the DCI is not DCI format 1_1 or DCI format 1_2.

In some embodiments, a PDSCH time domain resource assignment table applied by the DCI format 1_1 or DCI format 1_2 supports one DCI scheduling a plurality of PDSCHs.

In some embodiments, the apparatus may further include (optional, not shown):

a second determining unit configured to, in a case where the DCI is used for SPS activation, determine SPS PDSCH time domain resources and/or HARQ process identifiers of the SPS PDSCHs, wherein the PDSCH time domain resource assignment table applied by the DCI supports one DCI scheduling a plurality of PDSCHs.

In some embodiments, when the first information field of the DCI indicates at least two PDSCH time domain resources, the second determining unit determines the time domain resources of the SPS PDSCH according to one of the at least two PDSCH time domain resources or according to the at least two PDSCH time domain resources.

In some embodiments, the second determining unit determines slot to which each PDSCH time domain resource corresponds in different periods for each PDSCH time domain resource of the at least two PDSCH time domain resources.

In some embodiments, in a case where the first information field of the DCI indicates at least two PDSCH time domain resources, the second determining unit determines HARQ process identifiers of the SPS PDSCHs according to one of the at least two PDSCH time domain resources or according to the at least two PDSCH time domain resources.

In some embodiments, the second determining unit further determines the HARQ process identifiers of the SPS PDSCHs according to the number of the at least one PDSCH time domain resource indicated by the first information field of the DCI and/or sequence numbers of the PDSCH time domain resources in the at least one PDSCH time domain resource indicated by the first information field.

In some embodiments, the HARQ process identifiers to which the SPS PDSCH time domain resources in an SPS periodicity of SPS activated by the DCI correspond are identical or different.

In some embodiments, the format of the DCI is DCI format 1_1 or DCI format 1_2, and when the DCI is scrambled by using different RNTIs, the PDSCH time domain resource assignment tables applied by the DCI are different; and the apparatus further includes a third determining unit (optional, not shown) configured to, when the different PDSCH time domain resource assignment tables include different numbers of PDSCH time domain resource assignment configurations, determining the number of bits included in the DCI and/or the number of bits of the first information field of the DCI according to a maximum number of PDSCH time domain resource assignment configurations among different numbers of PDSCH time domain resource assignment configurations.

In some embodiments, the apparatus may further include (optional, not shown):

a first receiving unit configured to receive SPS configuration information transmitted by the network device; and a third determining unit configured to determine an SPS periodicity configured by the SPS configuration information according to an SCS of a DL BWP to which the SPS configuration corresponds, wherein when the SCS is 480 kHz or 960 kHz, the terminal equipment determines the SPS periodicity according to an SCS different from the SCS.

In some embodiments, the apparatus may further include (optional, not shown):

a second receiving unit configured to receive first indication information for configuring the PDSCH time domain resource assignment table, wherein the PDSCH time domain resource assignment table supports one DCI scheduling a plurality of PDSCHs.

In some embodiments, the apparatus may further include (optional, not shown):

a fourth determining unit configured to determine the PDSCH time domain resource assignment table applied by the DCI according to a first list, one column of the first list corresponding to the first indication information.

In some embodiments, the first list is used to determine a PDSCH time domain resource assignment table applied by the DCI in the format of DCI format 1_1, and is not used to determine a PDSCH time domain resource assignment table applied by the DCI in the format of DCI format 1_0.

In some embodiments, the format of the DCI is DCI format 1_1 or DCI format 1_2, and the PDSCH time domain resource assignment tables applied by the DCI are different when the DCI is scrambled by using different RNTIs.

In some embodiments, when the DCI is scrambled by a CS-RNTI, the PDSCH time domain resource assignment table applied by the DCI does not support one DCI scheduling a plurality of PDSCHs, and in a case where the DCI is scrambled by a non-CS-RNTI (a C-RNTI or an MCS-C-RNTI), the PDSCH time domain resource assignment tables applied by the DCI supports one DCI scheduling a plurality of PDSCHs.

In some embodiments, when the DCI is scrambled by a CS-RNTI, the PDSCH time domain resource assignment table applied by the DCI is not the PDSCH time domain resource assignment table configured by the first indication information; and when the DCI is scrambled by a non-CS-RNTI (a C-RNTI or an MCS-C-RNTI), the PDSCH time domain resource assignment table applied by the DCI is the PDSCH time domain resource assignment table configured by the first indication information.

In some embodiments, the format of the DCI is DCI format 1_1 or DCI format 1_2, and the PDSCH time domain resource assignment table applied by the DCI in a case where it is used for SPS activation and/or SPS retransmission is different from the PDSCH time domain resource assignment table applied by the DCI in a case where it is used for non-SPS activation and/or non-SPS retransmission.

In some embodiments, when the DCI is scrambled by a CS-RNTI, the PDSCH time domain resource assignment table applied by the DCI is not the PDSCH time domain resource assignment table for supporting one DCI scheduling a plurality of PDSCHs; and in a case where the DCI is scrambled by a non-CS-RNTI (a C-RNTI or an MCS-C-RNTI), the PDSCH time domain resource assignment table applied by the DCI is the PDSCH time domain resource assignment table for supporting one DCI scheduling a plurality of PDSCHs.

In some embodiments, when the DCI is scrambled by the CS-RNTI, the PDSCH time domain resource assignment table applied by the DCI is not the PDSCH time domain resource assignment table configured by the first indication information; When the DCI is scrambled by non CS-RNTI (a C-RNTI or an MCS-C-RNTI), the PDSCH time domain resource assignment table applied by the DCI is the PDSCH time domain resource assignment table configured by the first indication information.

Reference may be made to the embodiment of the third aspect for implementation of the data scheduling apparatus in FIG. 11, which shall not be repeated herein any further.

Figure 12:
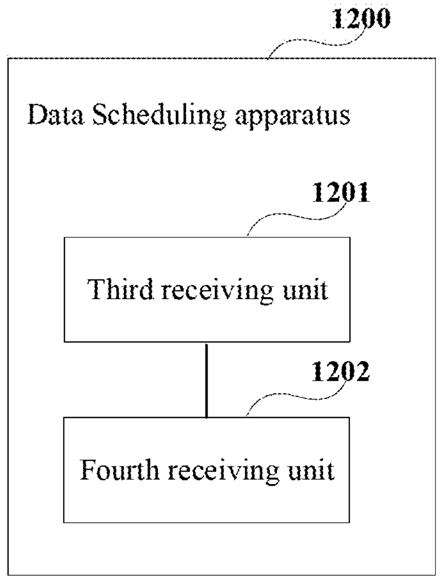
FIG. 12 is a schematic diagram of the data scheduling apparatus of an embodiment of this disclosure.

FIG. 12 is a schematic diagram of the data scheduling apparatus in the embodiment of this disclosure. As shown in FIG. 12, the apparatus includes:

a third receiving unit 1201 configured to receive downlink control information (DCI) for SPS activation, wherein the DCI includes a first information field for indicating time domain resource of at least one (M) PDSCH, and a PDSCH time domain resource assignment table applied by the DCI supports one DCI scheduling a plurality of PDSCHs; and a fourth receiving unit 1202 configured to receive an SPS PDSCH.

In some embodiments, the apparatus may further include (optional, not shown):

a fifth determining unit configured to, when the first information field of the DCI indicates at least two PDSCH time domain resources, determine time domain resources of the SPS PDSCH according to one of the at least two PDSCH time domain resources or according to the at least two PDSCH time domain resources.

In some embodiments, when the first information field of the DCI indicates at least two PDSCH time domain resources, the fifth determining unit determine the time domain resources of the SPS PDSCH according to one of the at least two PDSCH time domain resources or according to the at least two PDSCH time domain resources.

In some embodiments, for each PDSCH time domain resource in the at least two PDSCH time domain resources, the fifth determining unit respectively determines slot to which each PDSCH time domain resource corresponds in different periods.

In some embodiments, the apparatus may further include (optional, not shown):

a sixth determining unit configured to, in a case where a first information field of the DCI indicates at least two PDSCH time domain resources, determine an HARQ process identifier of the SPS PDSCH according to one of the at least two PDSCH time domain resources or according to the at least two PDSCH time domain resources.

In some embodiments, the apparatus may further include (optional, not shown):

a seventh determining unit configured to determine an HARQ process identifier of the SPS PDSCH according to the number of at least one PDSCH time domain resource indicated by the first information field of the DCI and/or a sequence number of a PDSCH time domain resource in the at least one PDSCH time domain resource indicated by the first information field.

In some embodiments, HARQ process identifiers to which SPS PDSCH time domain resources in one SPS periodicity of the SPS activated by the DCI correspond are identical or different.

Reference may be made to the embodiment of the second aspect for implementation of the data scheduling apparatus in FIG. 12, which shall not be repeated herein any further.

Figure 13:
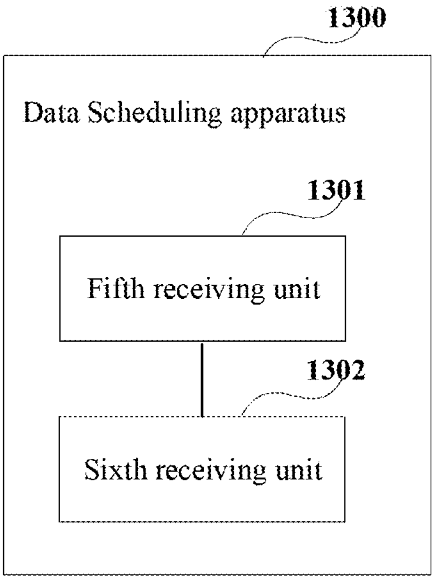
FIG. 13 is a schematic diagram of the data scheduling apparatus of an embodiment of this disclosure.

FIG. 13 is a schematic diagram of the data scheduling apparatus in the embodiment of this disclosure. As shown in FIG. 13, the apparatus includes:

a fifth receiving unit 1301 configured to receive first indication information for configuring a PDSCH time domain resource assignment table, wherein the PDSCH time domain resource assignment table is for supporting one DCI scheduling a plurality of PDSCHs; and a sixth receiving unit 1302 configured to receive downlink control information (DCI) used for scheduling a PDSCH.

In some embodiments, the apparatus may further include (optional, not shown):

a seventh determining unit configured to determine a PDSCH time domain resource assignment table applied by the DCI according to a first list, one column of the first list corresponding to the first indication information.

In some embodiments, the first list is used to determine the PDSCH time domain resource assignment table applied by the DCI in a format of DCI format 1_1, and is not used to determine the PDSCH time domain resource assignment table applied by the DCI in a format of DCI format 1_0.

In some embodiments, a format of the DCI is DCI format 1_1 or DCI format 1_2, and PDSCH time domain resource assignment tables applied by the DCIs scrambled by using different RNTIs are different.

In some embodiments, when the DCI is scrambled by a CS-RNTI, a PDSCH time domain resource assignment table applied by the DCI is not a PDSCH time domain resource assignment table for supporting one DCI scheduling a plurality of PDSCHs, and in a case where the DCI is scrambled by a non-CS-RNTI (a C-RNTI or an MCS-C-RNTI), a PDSCH time domain resource assignment table applied by the DCI is a PDSCH time domain resource assignment table for supporting one DCI scheduling a plurality of PDSCHs.

In some embodiments, when the DCI is scrambled by a CS-RNTI, the PDSCH time domain resource assignment table applied by the DCI is not the PDSCH time domain resource assignment table configured by the first indication information, and when the DCI is scrambled by a non-CS-RNTI (a C-RNTI or an MCS-C-RNTI), the PDSCH time domain resource assignment table applied by the DCI is the PDSCH time domain resource assignment table configured by the first indication information.

In some embodiments, a format of the DCI is DCI format 1_1 or DCI format 1_2, and a PDSCH time domain resource assignment table applied by the DCI when the DCI is used for SPS activation and/or SPS retransmission is different from a PDSCH time domain resource assignment table applied by the DCI when the DCI is used for non-SPS activation and/or non-SPS retransmission.

In some embodiments, when the DCI is used for SPS activation and/or SPS retransmission, a PDSCH time domain resource assignment table applied by the DCI is not a PDSCH time domain resource assignment table for supporting one DCI scheduling a plurality of PDSCHs, and when the DCI is used for non-SPS activation and/or non-SPS retransmission, a PDSCH time domain resource assignment table applied by the DCI is a PDSCH time domain resource assignment table for supporting one DCI scheduling a plurality of PDSCHs.

In some embodiments, when the DCI is used for SPS activation and/or SPS retransmission, a PDSCH time domain resource assignment table applied by the DCI is not a PDSCH time domain resource assignment table configured by the first indication information, and when the DCI is used for non-SPS activation and/or non-SPS retransmission, a PDSCH time domain resource assignment table applied by the DCI is a PDSCH time domain resource assignment table configured by the first indication information.

In some embodiments, a format of the DCI is DCI format 1_1 or DCI format 1_2, and PDSCH time domain resource assignment tables applied by the DCI scrambled by using different RNTIs are different; and the apparatus further includes (optional, not shown): an eighth determining unit; wherein when different PDSCH time domain resource assignment tables include different numbers of PDSCH time domain resource assignment configurations, the eighth determining unit determines the number of bits included in the DCI and/or the number of bits of a first information field in the DCI according to a maximum number of PDSCH time domain resource assignment configurations in different numbers of PDSCH time domain resource assignment configurations.

Reference may be made to the embodiment of the first aspect for implementation of the data scheduling apparatus in FIG. 13, which shall not be repeated herein any further.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and data scheduling apparatuses 1100, 1200 and 1300 may further include other components or modules, and reference may be made to related techniques for particulars of these components or modules.

Furthermore, for the sake of simplicity, connection relationships between the components or modules or signal profiles thereof are only illustrated in FIGS. 11-13. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

Embodiment of a Sixth Aspect

The embodiment of this disclosure provides a data transmitting apparatus. The apparatus may be, for example, a network device, or may be one or more components or assemblies configured in a network device. Contents in this embodiment identical to those in the embodiment of the fourth aspect shall not be described herein any further.

Figure 14:
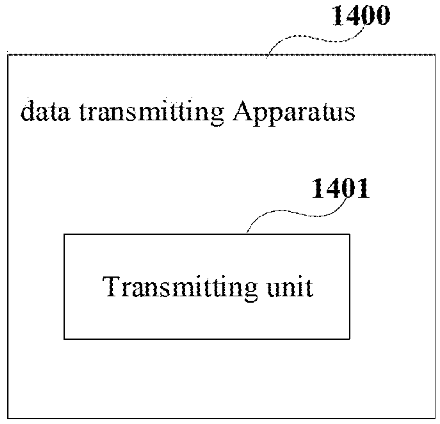
FIG. 14 is a schematic diagram of the data transmitting apparatus of an embodiment of this disclosure.

FIG. 14 is a schematic diagram of the data transmitting apparatus of the embodiment of this disclosure. As shown in FIG. 14, the apparatus includes:

a transmitting unit 1401 configured to transmit downlink control information (DCI) to a terminal equipment, the DCI including a first information field for indicating time domain resource of at least one (M) PDSCH, wherein that the DCI is used for semi-persistent scheduling (SPS) activation or is not used for SPS activation depends on the first information field and/or a PDSCH time domain resource assignment table applied by the DCI and/or a format of the DCI, or transmit semi-persistent scheduling (SPS) configuration information to a terminal equipment, the SPS configuration information including an SPS periodicity, and an SCS of a DL BWP to which the SPS configuration corresponds being used to determine an SPS periodicity configured by the SPS configuration information, wherein when the SCS is 480 kHz or 960 kHz, an SCS different from the SCS is used to determine the SPS periodicity; or, transmit first indication information for configuring a PDSCH time domain resource assignment table applied by the DCI to a terminal equipment, wherein the PDSCH time domain resource assignment table applied by the DCI supports one DCI scheduling a plurality of PDSCHs; or, transmit downlink control information (DCI) for SPS activation to a terminal equipment, the DCI including a first information field for indicating time domain resource of at least one (M) PDSCH, and a PDSCH time domain resource assignment table applied by the DCI supporting one DCI scheduling a plurality of PDSCHs.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and a data transmitting apparatus 1400 may further include other components or modules, and reference may be made to related techniques for particulars of these components or modules.

Furthermore, for the sake of simplicity, connection relationships between the components or modules or signal profiles thereof are only illustrated in FIG. 14. However, it should be understood by those skilled in the art that such related techniques as bus connection, etc., may be adopted.

And the above components or modules may be implemented by hardware, such as a processor, a memory, a transmitter, and a receiver, etc., which are not limited in the embodiment of this disclosure.

Embodiment of a Seventh Aspect

The embodiment of this disclosure provides a communication system, and reference may be made to FIG. 1, with contents identical to those in the embodiments of the first to the sixth aspects being not going to be described herein any further.

In some embodiments, the communication system 100 may at least include: a terminal equipment 102 and/or a network device 101.

In some embodiments, reference may be made to a terminal equipment 1500 below for implementation of the terminal equipment 102, and reference may be made to a network device 1400 below for implementation of the network device 101.

The embodiment of this disclosure further provides a network device, which may be, for example, a base station. However, this disclosure is not limited thereto, and it may also be another network device.

Figure 15:
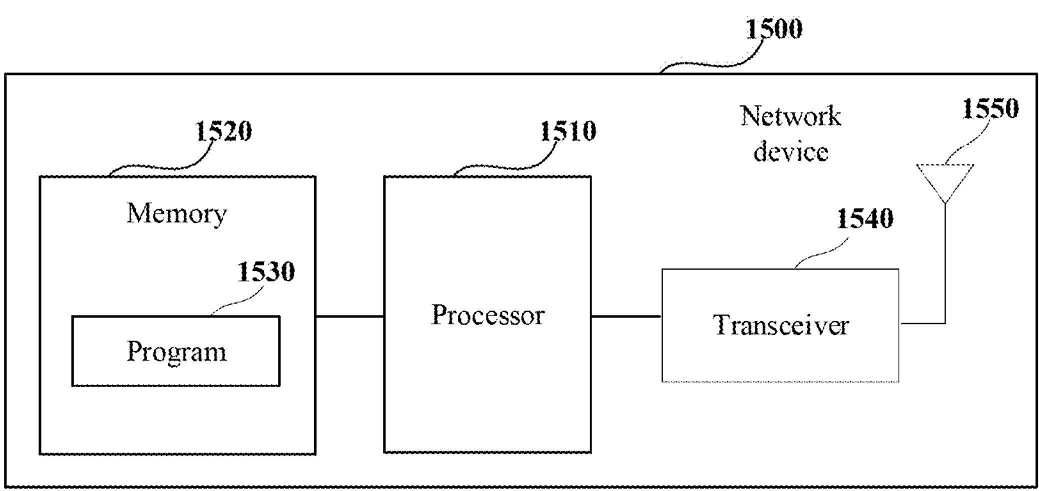
FIG. 15 is a schematic diagram of the network device of an embodiment of this disclosure.

FIG. 15 is a schematic diagram of a structure of the network device of the embodiment of this disclosure. As shown in FIG. 15, a network device 1500 may include a processor 1510 (such as a central processing unit (CPU)) and a memory 1520, the memory 1520 being coupled to the processor 1510. The memory 1520 may store various data, and furthermore, it may store a program 1530 for information processing, and execute the program 1530 under control of the processor 1510.

For example, the processor 1510 may be configured to execute a program to carry out the data transmitting method described in the embodiment of the fourth aspect.

Furthermore, as shown in FIG. 15, the network device 1500 may include a transceiver 1540, and an antenna 1550, etc. Functions of the above components are similar to those in the related art, and shall not be described herein any further. It should be noted that the network device 1500 does not necessarily include all the parts shown in FIG. 15, and furthermore, the network device 1500 may include parts not shown in FIG. 15, and the related art may be referred to.

The embodiment of this disclosure further provides a terminal equipment; however, this disclosure is not limited thereto, and it may also be another equipment.

Figure 16:
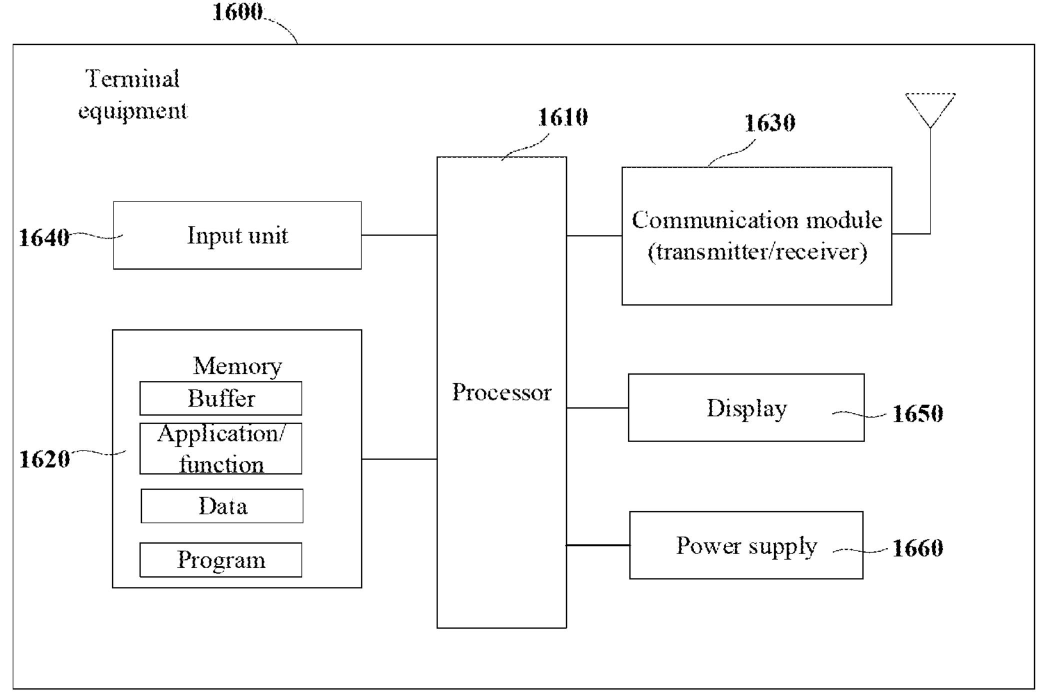
FIG. 16 is a schematic diagram of the terminal equipment of an embodiment of this disclosure.

FIG. 16 is a schematic diagram of the terminal equipment of the embodiment of this disclosure. As shown in FIG. 16, a terminal equipment 1600 may include a processor 1610 and a memory 1620, the memory 1620 storing data and a program and being coupled to the processor 1610. It should be noted that this figure is illustrative only, and other types of structures may also be used, so as to supplement or replace this structure and achieve a telecommunications function or other functions.

For example, the processor 1610 may be configured to execute a program to carry out the data scheduling method as described in the embodiment of the first or the second or the third aspect. As shown in FIG. 16, the terminal equipment 1600 may further include a communication module 1630, an input unit 1640, a display 1650, and a power supply 1660, wherein functions of the above components are similar to those in the related art, which shall not be described herein any further. It should be noted that the terminal equipment 1600 does not necessarily include all the parts shown in FIG. 16, and the above components are not necessary. Furthermore, the terminal equipment 1600 may include parts not shown in FIG. 16, and the related art may be referred to.

An embodiment of this disclosure provides a computer readable program, which, when executed in a terminal equipment, causes the terminal equipment to carry out the data scheduling method as described in the embodiment of the first or the second or the third aspect.

An embodiment of this disclosure provides a computer storage medium, including a computer readable program, which causes a terminal equipment to carry out the data scheduling method as described in the embodiment of the first or the second or the third aspect.

An embodiment of this disclosure provides a computer readable program, which, when executed in a network device, causes the network device to carry out the data transmitting method as described in the embodiment of the fourth aspect.

An embodiment of this disclosure provides a computer storage medium, including a computer readable program code, which causes a network device to carry out the data transmitting method as described in the embodiment of the fourth aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

As to implementations containing the above embodiments, following supplements are further disclosed.

1. A data scheduling method, applicable to a terminal equipment, characterized in that the method includes:

receiving downlink control information (DCI) by the terminal equipment, the DCI including a first information field for indicating at least one (M) PDSCH time domain resource; and validating that the DCI is used for semi-persistent scheduling (SPS) activation or is not used for SPS activation by the terminal equipment according to a first information field of the DCI and/or according to a PDSCH time domain resource assignment table applied by the DCI and/or a format of the DCI.

2. The method according to supplement 1, wherein when the DCI is used for SPS activation, the number of PDSCH time domain resources indicated by the first information field is not larger than 1 (M=1).

3. The method according to supplement 2, wherein the PDSCH time domain resource assignment table applied by the DCI supports one DCI scheduling a plurality of PDSCHs.

4. The method according to supplement 1 or 2, wherein when the DCI is scrambled by a CS-RNTI, the PDSCH time domain resource assignment table applied by the DCI does not support one DCI scheduling a plurality of PDSCHs, and when the DCI is scrambled by a non-CS-RNTI (a C-RNTI or an MCS-C-RNTI), the PDSCH time domain resource assignment table applied by the DCI supports one DCI scheduling a plurality of PDSCHs.

5. The method according to supplement 4, wherein a format of the DCI is DCI format 1_1 or DCI format 1_2.

6. The method according to supplement 1, wherein when the DCI is used for SPS activation, the PDSCH time domain resource assignment table applied by the DCI does not support one DCI scheduling a plurality of PDSCHs.

7. The method according to supplement 1, wherein when the DCI is used for SPS activation, the format of the DCI is not DCI format 1_1 or DCI format 1_2.

8. The method according to supplement 7, wherein a PDSCH time domain resource assignment table applied by the DCI format 1_1 or DCI format 1_2 supports one DCI scheduling a plurality of PDSCHs.

9. The method according to supplement 1, wherein in a case where the DCI is used for SPS activation, the terminal equipment determines SPS PDSCH time domain resources and/or HARQ process identifiers of the SPS PDSCH according to the DCI, wherein the PDSCH time domain resource assignment table applied by the DCI supports one DCI scheduling a plurality of PDSCHs.

10. The method according to supplement 9, wherein the method further includes:

when the first information field of the DCI indicates at least two PDSCH time domain resources, determining the time domain resources of the SPS PDSCH by the terminal equipment according to one of the at least two PDSCH time domain resources or according to the at least two PDSCH time domain resources.

11. The method according to supplement 10, wherein the method further includes:

determining slot to which each PDSCH time domain resources corresponds in different periods by the terminal equipment for each PDSCH time domain resource in the at least two PDSCH time domain resources.

12. The method according to supplement 8, wherein the method further includes:

in a case where the first information field of the DCI indicates at least two PDSCH time domain resources, determining HARQ process identifiers of the SPS PDSCHs by the terminal equipment according to one of the at least two PDSCH time domain resources or according to the at least two PDSCH time domain resources.

13. The method according to supplement 9 or 12, wherein the method further includes:

determining the HARQ process identifiers of the SPS PDSCHs by the terminal equipment according to the number of the at least one PDSCH time domain resource indicated by the first information field of the DCI and/or sequence numbers of the PDSCH time domain resources in the at least one PDSCH time domain resource indicated by the first information field.

14. The method according to supplement 9 or 13, wherein the HARQ process identifiers to which the SPS PDSCH time domain resources in an SPS periodicity of SPS activated by the DCI correspond are identical or different.

15. The method according to any one of supplements 1-13, wherein the method further includes:

the format of the DCI is DCI format 1_1 or DCI format 1_2, and when the DCI is scrambled by using different RNTIs, the PDSCH time domain resource assignment tables applied by the DCI are different;

wherein when the different PDSCH time domain resource assignment tables include different numbers of PDSCH time domain resource assignment configurations, determining the number of bits included in the DCI and/or the number of bits of the first information field of the DCI by the terminal equipment according to a maximum number of PDSCH time domain resource assignment configurations among different numbers of PDSCH time domain resource assignment configurations.

16. The method according to any one of supplements 1-15, wherein the method further includes:

receiving, by the terminal equipment, SPS configuration information transmitted by the network device, and determining an SPS periodicity configured by the SPS configuration information by the terminal equipment according to an SCS of a DL BWP to which the SPS configuration corresponds, wherein when the SCS is 480 kHz or 960 kHz, determining the SPS periodicity by the terminal equipment according to an SCS different from the SCS.

17. The method according to supplement 1, wherein the method further includes:

receiving first indication information for configuring the PDSCH time domain resource assignment table by the terminal equipment, wherein the PDSCH time domain resource assignment table supports one DCI scheduling a plurality of PDSCHs.

18. The method according to supplement 17, wherein the method further includes:

determining the PDSCH time domain resource assignment table applied by the DCI by the terminal equipment according to a first list, one column of the first list corresponding to the first indication information.

19. The method according to supplement 18, wherein the first list is used to determine a PDSCH time domain resource assignment table applied by the DCI in the format of DCI format 1_1, and is not used to determine a PDSCH time domain resource assignment table applied by the DCI in the format of DCI format 1_0.

20. The method according to any one of supplements 17-19, wherein the format of the DCI is DCI format 1_1 or DCI format 1_2, and the PDSCH time domain resource assignment tables applied by the DCI are different when the DCI is scrambled by using different RNTIs.

21. The method according to supplement 20, wherein when the DCI is scrambled by a CS-RNTI, the PDSCH time domain resource assignment table applied by the DCI does not support one DCI scheduling a plurality of PDSCHs, and in a case where the DCI is scrambled by a non-CS-RNTI (a C-RNTI or an MCS-C-RNTI), the PDSCH time domain resource assignment tables applied by the DCI supports one DCI scheduling a plurality of PDSCHs.

22. The method according to supplement 21, wherein when the DCI is scrambled by a CS-RNTI, the PDSCH time domain resource assignment table applied by the DCI is not the PDSCH time domain resource assignment table configured by the first indication information; and when the DCI is scrambled by a non-CS-RNTI (a C-RNTI or an MCS-C-RNTI), the PDSCH time domain resource assignment table applied by the DCI is the PDSCH time domain resource assignment table configured by the first indication information.

23. The method according to any one of supplements 17-19, wherein the format of the DCI is DCI format 1_1 or DCI format 1_2, and the PDSCH time domain resource assignment table applied by the DCI in a case where it is used for SPS activation and/or SPS re-transmission is different from the PDSCH time domain resource assignment table applied by the DCI in a case where it is used for non-SPS activation and/or non-SPS re-transmission.

24. The method according to supplement 23, wherein when the DCI is scrambled by a CS-RNTI, the PDSCH time domain resource assignment table applied by the DCI is not the PDSCH time domain resource assignment table for supporting one DCI scheduling a plurality of PDSCHs; and in a case where the DCI is scrambled by a non-CS-RNTI (a C-RNTI or an MCS-C-RNTI), the PDSCH time domain resource assignment table applied by the DCI is the PDSCH time domain resource assignment table for supporting one DCI scheduling a plurality of PDSCHs.

25. The method according to supplement 24, wherein when the DCI is scrambled by the CS-RNTI, the PDSCH time domain resource assignment table applied by the DCI is not the PDSCH time domain resource assignment table configured by the first indication information; When the DCI is scrambled by non CS-RNTI (a C-RNTI or an MCS-C-RNTI), the PDSCH time domain resource assignment table applied by the DCI is the PDSCH time domain resource assignment table configured by the first indication information.

26. A data scheduling method, characterized in that the method includes:

receiving, by a terminal equipment, downlink control information (DCI) for SPS activation, wherein the DCI includes a first information field for indicating time domain resource of at least one (M) PDSCH, and a PDSCH time domain resource assignment table applied by the DCI supports one DCI scheduling a plurality of PDSCHs; and receiving an SPS PDSCH by the terminal equipment.

27. The method according to supplement 26, wherein the method further includes:

when the first information field of the DCI indicates at least two PDSCH time domain resources, determining the time domain resources of the SPS PDSCH by the terminal equipment according to one of the at least two PDSCH time domain resources or according to the at least two PDSCH time domain resources.

28. The method according to supplement 26, wherein the method further includes:

determining slot to which each PDSCH time domain resources corresponds in different periods by the terminal equipment for each PDSCH time domain resource in the at least two PDSCH time domain resources.

29. The method according to any one of supplements 26-28, wherein the method further includes:

in a case where the first information field of the DCI indicates at least two PDSCH time domain resources, determining HARQ process identifiers of the SPS PDSCHs by the terminal equipment according to one of the at least two PDSCH time domain resources or according to the at least two PDSCH time domain resources.

30. The method according to any one of supplements 26-29, wherein the method further includes:

determining the HARQ process identifiers of the SPS PDSCHs by the terminal equipment according to the number of the at least one PDSCH time domain resource indicated by the first information field of the DCI and/or sequence numbers of the PDSCH time domain resources in the at least one PDSCH time domain resource indicated by the first information field.

31. The method according to any one of supplements 26-30, wherein the HARQ process identifiers to which the SPS PDSCH time domain resources in an SPS periodicity of SPS activated by the DCI correspond are identical or different.

32. A data scheduling method, characterized in that the method includes:

receiving, by a terminal equipment, first indication information for configuring a PDSCH time domain resource assignment table, wherein the PDSCH time domain resource assignment table is used to support one DCI scheduling a plurality of PDSCHs; and receiving downlink control information (DCI) used for scheduling a PDSCH by the terminal equipment.

33. The method according to supplement 32, wherein the method further includes:

determining the PDSCH time domain resource assignment table applied by the DCI by the terminal equipment according to a first list, one column of the first list corresponding to the first indication information.

34. The method according to supplement 33, wherein the first list is used to determine the PDSCH time domain resource assignment table applied by the DCI in a format of DCI format 1_1 or DCI format 1_2, and is not used to determine the PDSCH time domain resource assignment table applied by the DCI in a format of DCI format 1_0.

35. The method according to any one of supplements 32-34, wherein the format of the DCI is DCI format 1_1 or DCI format 1_2, and when the DCI is scrambled by using different RNTIs, the PDSCH time domain resource assignment tables applied by the DCIs are different.

36. The method according to supplement 35, wherein when the DCI is scrambled by a CS-RNTI, the PDSCH time domain resource assignment table applied by the DCI is not the PDSCH time domain resource assignment table for supporting one DCI scheduling a plurality of PDSCHs; and in a case where the DCI is scrambled by a non-CS-RNTI (a C-RNTI or an MCS-C-RNTI), the PDSCH time domain resource assignment table applied by the DCI is the PDSCH time domain resource assignment table for supporting one DCI scheduling a plurality of PDSCHs.

37. The method according to supplement 36, wherein when the DCI is scrambled by a CS-RNTI, the PDSCH time domain resource assignment table applied by the DCI is not the PDSCH time domain resource assignment table configured by the first indication information; and when the DCI is scrambled by a non-CS-RNTI (a C-RNTI or an MCS-C-RNTI), the PDSCH time domain resource assignment table applied by the DCI is the PDSCH time domain resource assignment table configured by the first indication information.

38. The method according to any one of supplements 32-34, wherein the format of the DCI is DCI format 1_1 or DCI format 1_2, and the PDSCH time domain resource assignment table applied by the DCI when it is used for SPS activation and/or SPS re-transmission is different from the PDSCH time domain resource assignment table applied by the DCI when it is used for non-SPS activation and/or non-SPS re-transmission.

39. The method according to supplement 38, wherein when the DCI is used for SPS activation and/or SPS re-transmission, the PDSCH time domain resource assignment table applied by the DCI is not the PDSCH TDRA table for supporting one DCI scheduling a plurality of PDSCHs, and when the DCI is used for non-SPS activation and/or non-SPS re-transmission, the PDSCH time domain resource assignment table applied by the DCI is the PDSCH TDRA table for supporting one DCI scheduling a plurality of PDSCHs.

40. The method according to supplement 39, wherein when the DCI is used for SPS activation and/or SPS re-transmission, the PDSCH time domain resource assignment table applied by the DCI is not the PDSCH TDRA table configured by the first indication information, and when the DCI is used for non-SPS activation and/or non-SPS re-transmission, the PDSCH time domain resource assignment table applied by the DCI is the PDSCH TDRA table configured by the first indication information.

41. The method according to any one of supplements 32-40, wherein the method further includes:

the format of the DCI is DCI format 1_1 or DCI format 1_2, and when the DCI is scrambled by using different RNTIs, the PDSCH time domain resource assignment tables applied by the DCI are different;

wherein when the different PDSCH time domain resource assignment tables include different numbers of PDSCH time domain resource assignment configurations, determining the number of bits included in the DCI and/or the number of bits of the first information field of the DCI by the terminal equipment according to a maximum number of PDSCH time domain resource assignment configurations among different numbers of PDSCH time domain resource assignment configurations.

42. A data transmitting method, characterized in that the method includes:

transmitting downlink control information (DCI) by a network device to a terminal equipment, the DCI including a first information field for indicating time domain resource of at least one (M) PDSCH, wherein that the DCI is used for semi-persistent scheduling (SPS) activation or is not used for SPS activation depends on the first information field and/or a PDSCH time domain resource assignment table applied by the DCI and/or a format of the DCI, or transmitting semi-persistent scheduling (SPS) configuration information by a network device to a terminal equipment, the SPS configuration information including an SPS periodicity, and an SCS of a DL BWP to which the SPS configuration corresponds being used to determine an SPS periodicity configured by the SPS configuration information, wherein when the SCS is 480 kHz or 960 kHz, an SCS different from the SCS is used to determine the SPS periodicity; or, transmitting first indication information for configuring a PDSCH time domain resource assignment table applied by the DCI by a network device to a terminal equipment, wherein the PDSCH time domain resource assignment table applied by the DCI supports one DCI scheduling a plurality of PDSCHs; or, transmitting downlink control information (DCI) for SPS activation by a network device to a terminal equipment, the DCI including a first information field for indicating time domain resource of at least one (M) PDSCH, and a PDSCH time domain resource assignment table applied by the DCI supporting one DCI scheduling a plurality of PDSCHs.

43. A network device, including a memory and a processor, the memory storing a computer program, and the processor being configured to execute the computer program to carry out the data transmitting method as described in supplement 42.

44. A terminal equipment, including a memory and a processor, the memory storing a computer program, and the processor being configured to execute the computer program to carry out the data scheduling method as described in any one of supplements 1-41.

45. A communication system, including:

the terminal equipment as described in supplement 44, and/or the network device as described in supplement 43.

46. A data scheduling apparatus, applicable to a terminal equipment, characterized in that the apparatus includes:

a first receiving configured to receive downlink control information (DCI), the DCI including a first information field for indicating time domain resource of at least one (M) PDSCH; and a first validating configured to validate that the DCI is used for semi-persistent scheduling (SPS) activation or is not used for SPS activation according to a first information field of the DCI and/or according to a PDSCH time domain resource assignment table applied by the DCI and/or a format of the DCI.

47. The apparatus according to supplement 46, wherein when the DCI is used for SPS activation, the number of PDSCH time domain resources indicated by the first information field is not larger than 1 (M=1).

48. The apparatus according to supplement 47, wherein the PDSCH time domain resource assignment table applied by the DCI supports one DCI scheduling a plurality of PDSCHs.

49. The apparatus according to supplement 46 or 47, wherein when the DCI is scrambled by a CS-RNTI, the PDSCH time domain resource assignment table applied by the DCI does not support one DCI scheduling a plurality of PDSCHs, and when the DCI is scrambled by a non-CS-RNTI (a C-RNTI or an MCS-C-RNTI), the PDSCH time domain resource assignment table applied by the DCI supports one DCI scheduling a plurality of PDSCHs.

50. The apparatus according to supplement 49, wherein a format of the DCI is DCI format 1_1 or DCI format 1_2.

51. The apparatus according to supplement 46, wherein when the DCI is used for SPS activation, the PDSCH time domain resource assignment table applied by the DCI does not support one DCI scheduling a plurality of PDSCHs.

52. The apparatus according to supplement 46, wherein when the DCI is used for SPS activation, the format of the DCI is not DCI format 1_1 or DCI format 1_2.

53. The apparatus according to supplement 52, wherein a PDSCH time domain resource assignment table applied by the DCI format 1_1 or DCI format 1_2 supports one DCI scheduling a plurality of PDSCHs.

54. The apparatus according to supplement 46, wherein the apparatus further includes:

a second determining unit configured to, in a case where the DCI is used for SPS activation, determine SPS PDSCH time domain resources and/or HARQ process identifiers of the SPS PDSCH according to the DCI, wherein the PDSCH time domain resource assignment table applied by the DCI supports one DCI scheduling a plurality of PDSCHs.

55. The apparatus according to supplement 54, wherein when the first information field of the DCI indicates at least two PDSCH time domain resources, the second determining unit determines the time domain resources of the SPS PDSCH according to one of the at least two PDSCH time domain resources or according to the at least two PDSCH time domain resources.

56. The apparatus according to supplement 55, wherein the second determining unit determines slot to which each PDSCH time domain resources corresponds in different periods for each PDSCH time domain resource in the at least two PDSCH time domain resources.

57. The apparatus according to supplement 54, wherein in a case where the first information field of the DCI indicates at least two PDSCH time domain resources, the second determining unit determines HARQ process identifiers of the SPS PDSCHs by the terminal equipment according to one of the at least two PDSCH time domain resources or according to the at least two PDSCH time domain resources.

58. The apparatus according to supplement 54, wherein the second determining unit further determines the HARQ process identifiers of the SPS PDSCHs according to the number of the at least one PDSCH time domain resource indicated by the first information field of the DCI and/or sequence numbers of the PDSCH time domain resources in the at least one PDSCH time domain resource indicated by the first information field.

59. The apparatus according to supplement 54, wherein the HARQ process identifiers to which the SPS PDSCH time domain resources in an SPS periodicity of SPS activated by the DCI correspond are identical or different.

60. The apparatus according to supplement 46, wherein the format of the DCI is DCI format 1_1 or DCI format 1_2, and when the DCI is scrambled by using different RNTIs, the PDSCH time domain resource assignment tables applied by the DCI are different;

and the apparatus further includes a third determining unit configured to, when the different PDSCH time domain resource assignment tables include different numbers of PDSCH time domain resource assignment configurations, determine the number of bits included in the DCI and/or the number of bits of the first information field of the DCI according to a maximum number of PDSCH time domain resource assignment configurations among different numbers of PDSCH time domain resource assignment configurations.

61. The apparatus according to supplement 46, wherein the apparatus further includes:

a first receiving unit configured to receive SPS configuration information transmitted by the network device; and a third determining unit configured to determine an SPS periodicity configured by the SPS configuration information according to an SCS of a DL BWP to which the SPS configuration corresponds, wherein when the SCS is 480 kHz or 960 kHz, the terminal equipment further determines the SPS periodicity according to an SCS different from the SCS.

62. The apparatus according to supplement 46, wherein the apparatus further includes:

a second receiving unit configured to receive first indication information for configuring the PDSCH time domain resource assignment table, wherein the PDSCH time domain resource assignment table supports one DCI scheduling a plurality of PDSCHs.

63. The apparatus according to supplement 62, wherein the apparatus further includes:

a fourth determining unit configured to determine the PDSCH time domain resource assignment table applied by the DCI according to a first list, one column of the first list corresponding to the first indication information.

64. The apparatus according to supplement 63, wherein the first list is used to determine a PDSCH time domain resource assignment table applied by the DCI in the format of DCI format 1_1, and is not used to determine a PDSCH time domain resource assignment table applied by the DCI in the format of DCI format 1_0.

65. The apparatus according to supplement 62, wherein the format of the DCI is DCI format 1_1 or DCI format 1_2, and the PDSCH time domain resource assignment tables applied by the DCI are different when the DCI is scrambled by using different RNTIs.

66. The apparatus according to supplement 65, wherein when the DCI is scrambled by a CS-RNTI, the PDSCH time domain resource assignment table applied by the DCI does not support one DCI scheduling a plurality of PDSCHs, and in a case where the DCI is scrambled by a non-CS-RNTI (a C-RNTI or an MCS-C-RNTI), the PDSCH time domain resource assignment tables applied by the DCI supports one DCI scheduling a plurality of PDSCHs.

67. The apparatus according to supplement 63, wherein when the DCI is scrambled by a CS-RNTI, the PDSCH time domain resource assignment table applied by the DCI is not the PDSCH time domain resource assignment table configured by the first indication information; and when the DCI is scrambled by a non-CS-RNTI (a C-RNTI or an MCS-C-RNTI), the PDSCH time domain resource assignment table applied by the DCI is the PDSCH time domain resource assignment table configured by the first indication information.

68. The apparatus according to supplement 62, wherein the format of the DCI is DCI format 1_1 or DCI format 1_2, and the PDSCH time domain resource assignment table applied by the DCI in a case where it is used for SPS activation and/or SPS re-transmission is different from the PDSCH time domain resource assignment table applied by the DCI in a case where it is used for non-SPS activation and/or non-SPS re-transmission.

69. The apparatus according to supplement 68, wherein when the DCI is scrambled by a CS-RNTI, the PDSCH time domain resource assignment table applied by the DCI is not the PDSCH time domain resource assignment table for supporting one DCI scheduling a plurality of PDSCHs; and in a case where the DCI is scrambled by a non-CS-RNTI (a C-RNTI or an MCS-C-RNTI), the PDSCH time domain resource assignment table applied by the DCI is the PDSCH time domain resource assignment table for supporting one DCI scheduling a plurality of PDSCHs.

70. The apparatus according to supplement 69, wherein when the DCI is scrambled by the CS-RNTI, the PDSCH time domain resource assignment table applied by the DCI is not the PDSCH time domain resource assignment table configured by the first indication information; when the DCI is scrambled by non CS-RNTI (a C-RNTI or an MCS-C-RNTI), the PDSCH time domain resource assignment table applied by the DCI is the PDSCH time domain resource assignment table configured by the first indication information.

71. A data scheduling apparatus, characterized in that the apparatus includes:

a third receiving unit configured to receive downlink control information (DCI) for SPS activation, wherein the DCI includes a first information field for indicating time domain resource of at least one (M) PDSCH, and a PDSCH time domain resource assignment table applied by the DCI supports one DCI scheduling a plurality of PDSCHs; and a fourth receiving unit configured to receive an SPS PDSCH.

72. The apparatus according to supplement 71, wherein the apparatus further includes:

a fifth determining unit configured to, when the first information field of the DCI indicates at least two PDSCH time domain resources, determine the time domain resources of the SPS PDSCH according to one of the at least two PDSCH time domain resources or according to the at least two PDSCH time domain resources.

73. The apparatus according to supplement 71, wherein the fifth determining unit determines slot to which each PDSCH time domain resource corresponds in different periods for PDSCH time domain resources in the at least two PDSCH time domain resources.

74. The apparatus according to supplement 71, wherein the apparatus further includes: a sixth determining unit configured to, in a case where the first information field of the DCI indicates at least two PDSCH time domain resources, determine HARQ process identifiers of the SPS PDSCHs according to one of the at least two PDSCH time domain resources or according to the at least two PDSCH time domain resources.

75. The apparatus according to supplement 71, wherein the apparatus further includes: a seventh determining unit configured to determine the HARQ process identifiers of the SPS PDSCHs according to the number of the at least one PDSCH time domain resource indicated by the first information field of the DCI and/or sequence numbers of the PDSCH time domain resources in the at least one PDSCH time domain resource indicated by the first information field.

76. The apparatus according to supplement 71, wherein the HARQ process identifiers to which the SPS PDSCH time domain resources in an SPS periodicity of SPS activated by the DCI correspond are identical or different.

77. A data scheduling apparatus, applicable to a terminal equipment, characterized in that the apparatus includes:

a fifth receiving unit configured to receive first indication information for configuring a PDSCH time domain resource assignment table, wherein the PDSCH time domain resource assignment table is used to support one DCI scheduling a plurality of PDSCHs; and a sixth receiving unit configured to receive downlink control information (DCI) used for scheduling a PDSCH.

78. The apparatus according to supplement 77, wherein the apparatus further includes:

an eighth determining unit configured to determine the PDSCH time domain resource assignment table applied by the DCI according to a first list, one column of the first list corresponding to the first indication information.

79. The apparatus according to supplement 78, wherein the first list is used to determine the PDSCH time domain resource assignment table applied by the DCI in a format of DCI format 1_1 or DCI format 1_2, and is not used to determine the PDSCH time domain resource assignment table applied by the DCI in a format of DCI format 1_0.

80. The apparatus according to supplement 77, wherein the format of the DCI is DCI format 1_1 or DCI format 1_2, and when the DCI is scrambled by using different RNTIs, the PDSCH time domain resource assignment tables applied by the DCI are different.

81. The apparatus according to supplement 80, wherein when the DCI is scrambled by a CS-RNTI, the PDSCH time domain resource assignment table applied by the DCI is not the PDSCH time domain resource assignment table for supporting one DCI scheduling a plurality of PDSCHs; and in a case where the DCI is scrambled by a non-CS-RNTI (a C-RNTI or an MCS-C-RNTI), the PDSCH time domain resource assignment table applied by the DCI is the PDSCH time domain resource assignment table for supporting one DCI scheduling a plurality of PDSCHs.

82. The apparatus according to supplement 81, wherein when the DCI is scrambled by a CS-RNTI, the PDSCH time domain resource assignment table applied by the DCI is not the PDSCH time domain resource assignment table configured by the first indication information; and when the DCI is scrambled by a non-CS-RNTI (a C-RNTI or an MCS-C-RNTI), the PDSCH time domain resource assignment table applied by the DCI is the PDSCH time domain resource assignment table configured by the first indication information.

83. The apparatus according to supplement 77, wherein the format of the DCI is DCI format 1_1 or DCI format 1_2, and the PDSCH time domain resource assignment table applied by the DCI when it is used for SPS activation and/or SPS re-transmission is different from the PDSCH time domain resource assignment table applied by the DCI when it is used for non-SPS activation and/or non-SPS re-transmission.

84. The apparatus according to supplement 83, wherein when the DCI is used for SPS activation and/or SPS re-transmission, the PDSCH time domain resource assignment table applied by the DCI is not the PDSCH TDRA table for supporting one DCI scheduling a plurality of PDSCHs, and when the DCI is used for non-SPS activation and/or non-SPS re-transmission, the PDSCH time domain resource assignment table applied by the DCI is the PDSCH TDRA table for supporting one DCI scheduling a plurality of PDSCHs.

85. The apparatus according to supplement 84, wherein when the DCI is used for SPS activation and/or SPS re-transmission, the PDSCH time domain resource assignment table applied by the DCI is not the PDSCH TDRA table configured by the first indication information, and when the DCI is used for non-SPS activation and/or non-SPS re-transmission, the PDSCH time domain resource assignment table applied by the DCI is the PDSCH TDRA table configured by the first indication information.

86. The apparatus according to supplement 87, wherein the format of the DCI is DCI format 1_1 or DCI format 1_2, and when the DCI is scrambled by using different RNTIs, the PDSCH time domain resource assignment tables applied by the DCI are different;

and the apparatus further includes an eighth determining unit;

wherein when the different PDSCH time domain resource assignment tables include different numbers of PDSCH time domain resource assignment configurations, the eighth determining unit determine the number of bits included in the DCI and/or the number of bits of the first information field of the DCI according to a maximum number of PDSCH time domain resource assignment configurations among different numbers of PDSCH time domain resource assignment configurations.

87. A data transmitting apparatus, applicable to a network device, characterized in that the apparatus includes:

a transmitting unit configured to transmit downlink control information (DCI) to a terminal equipment, the DCI including a first information field for indicating time domain resource of at least one (M) PDSCH, wherein that the DCI is used for semi-persistent scheduling (SPS) activation or is not used for SPS activation depends on the first information field and/or a PDSCH time domain resource assignment table applied by the DCI and/or a format of the DCI, or transmit semi-persistent scheduling (SPS) configuration information by a network device to a terminal equipment, the SPS configuration information including an SPS periodicity, and an SCS of a DL BWP to which the SPS configuration corresponds being used to determine an SPS periodicity configured by the SPS configuration information, wherein when the SCS is 480 kHz or 960 kHz, an SCS different from the SCS is used to determine the SPS periodicity; or, transmit first indication information for configuring a PDSCH time domain resource assignment table applied to a terminal equipment, wherein the PDSCH time domain resource assignment table applied by the DCI supports one DCI scheduling a plurality of PDSCHs; or, transmit downlink control information (DCI) for SPS activation to a terminal equipment, the DCI including a first information field for indicating time domain resource of at least one (M) PDSCH, and a PDSCH time domain resource assignment table applied by the DCI supporting one DCI scheduling a plurality of PDSCHs.

The invention claimed is:

1. An apparatus, applicable to a terminal equipment, the apparatus comprising:

a receiver configured to receive downlink control information (DCI), the DCI is used for scheduling one or a plurality of physical downlink shared channels (PDSCHs) or Semi-Persistent Scheduling (SPS) activation, wherein when the DCI is a first DCI used for scheduling the one or the plurality of physical downlink shared channels, a value m of a time domain resource assignment field in the DCI indicating a row index m+1 to a resource allocation table in which one or more rows contain a plurality of start and length indicators (SLIVs), wherein m is an integer greater than or equal to 0, when the DCI is a second DCI used for the SPS activation, the time domain resource assignment field in the DCI indicates a row with single SLIV, and the receiver is further configured to receive a SPS PDSCH after receiving the second DCI.

2. The apparatus according to claim 1, wherein the DCI is DCI format 1_1.

3. The apparatus according to claim 1, wherein the one or the plurality of physical downlink shared channels (PDSCHs) scheduled by the DCI is in one cell.

4. The apparatus according to claim 1, when the DCI indicates re-transmission of the SPS PDSCH, the time domain resource assignment field in the DCI indicates a row with single SLIV.

5. The apparatus according to claim 1, wherein, when the DCI is the second DCI, a CRC of the DCI is scrambled with a CS-RNTI; and a new data indicator field in the DCI is set to '0'; and if a PDSCH-to-hybrid automatic repeat request (HARQ)_feedback timing indicator field in the DCI is present, the PDSCH-to-HARQ_feedback timing indicator field does not provide an inapplicable value.

6. The apparatus according to claim 5, wherein, when the terminal equipment is provided a single configuration for SPS, a HARQ process number field in the DCI is set to all '0's and a Redundancy version field for an enabled transport block (TB) in the DCI is set to all '0'.

7. The apparatus according to claim 5, wherein, when the terminal equipment is provided more than one configuration for SPS, a Redundancy version field for an enabled transport block (TB) in the DCI is set to all '0's.

8. The apparatus according to claim 1, further comprising:

processor circuitry configured to validate that the DCI is used for semi-persistent scheduling (SPS) activation according to the time domain resource assignment field.

9. The apparatus according to claim 1, the apparatus further comprises:

processor circuitry configured to have to validate the DCI is used for Semi-Persistent Scheduling (SPS) activation when a CRC of the DCI is scrambled with a CS-RNTI, and a new data indicator field in the DCI is set to '0', and the time domain resource assignment field in the DCI format indicates a row with single SLIV and if a PDSCH-to-HARQ_feedback timing indicator field in the DCI is present, the PDSCH-to-HARQ_feedback timing indicator field does not provide an inapplicable value.

10. The apparatus according to claim 9, when the terminal equipment is provided a single configuration for SPS, the processor circuitry validates the DCI is used for Semi-Persistent Scheduling (SPS) activation if a HARQ process number field in the DCI is set to all '0's and a Redundancy version field for an enabled transport block (TB) in the DCI is set to all '0';

the processor circuitry discards all the information in the DCI if the HARQ process number field is not set to all '0's and/or the Redundancy version field is not set to all '0's.

11. The apparatus according to claim 9, when the terminal equipment is provided more than one configuration for SPS, the processor circuitry validates the DCI is used for Semi-Persistent Scheduling (SPS) activation if a Redundancy version field for an enabled transport block (TB) in the DCI is set to all '0's;

the processor circuitry discards all the information in the DCI if the Redundancy version field is not set to all '0's.

12. The apparatus according to claim 1, wherein the receiver is further configured to receive SPS configuration information (SPS-Config) which includes information on: periodicity for SPS, and/or number of configured HARQ processes for SPS (nrofHARQ-Processes), and/or an offset used in deriving HARQ process IDs (harq-ProcID-Offset), and/or number of repetitions for SPS PDSCH (pdsch-AggregationFactor).

13. The apparatus according to claim 12, wherein when an SCS of a DL BWP to which the SPS configuration information corresponds is 480 kHz or 960 kHz, the information on periodicity directly indicates a periodicity supported for the SCS.

14. The apparatus according to claim 1, the receiver further configured to receive first indication information for configuring the resource allocation table, the first indication information being carried by PDSCH configuration pdsch-Config in dedicated DL BWP configuration (BWP-DownlinkDedicated).

15. The apparatus according to claim 1, wherein when the DCI scheduling a plurality of PDSCHs, the time domain resource assignment field in the DCI indicating a row with a plurality of SLIVs which are one-to-one mapping to the plurality of PDSCHs.

16. The apparatus according to claim 1, a row with multiple SLIVs contains a plurality of slot offsets $K_0$ which are one-to-one mapping to the plurality of PDSCHs, and a plurality of PDSCH mapping types which are one-to-one mapping to the plurality of PDSCHs.

17. The apparatus according to claim 1, wherein $N^{th}$ SPS PDSCH (downlink assignment) occurs in a slot for which:

$$(numberOfSlotsPerFrame \times SFN + \text{slot number in the frame}) = [(numberOfSlotsPerFrame \times SFN_{start\ time} + \text{slot}_{start\ time}) + N \times \text{periodicity} \times numberOfSlotsPerFrame / 10] \text{ modulo } (1024 \times numberOfSlotsPerFrame);$$

wherein numberOfSlotsPerFrame refers to the number of consecutive slots per frame, periodicity denotes a periodicity configured for SPS, $SFN_{start\ time}$ and $slot_{start\ time}$ are the SFN and the slot, respectively, of the first SPS PDSCH;

and/or wherein the apparatus further comprises:

processor circuitry configured to derive an HARQ process ID associated with a slot where a DL transmission starts from the following equation:

$$HARQ\ \text{Process}\ ID = [\text{floor}\ (\text{CURRENT\_slot} \times 10 / (numberOfSlotsPerFrame \times \text{periodicity}))] \text{ modulo } nrofHARQ\text{-}Processes$$

or $$HARQ\ \text{Process}\ ID = [\text{floor}\ (\text{CURRENT\_slot} \times 10 / (numberOfSlotsPerFrame \times \text{periodicity}))] \text{ modulo } nrofHARQ\text{-}Processes + harq\text{-}ProcID\text{-}Offset$$

where CURRENT_slot=[(SFN×numberOfSlotsPerFrame)+slot number in the frame] and numberOfSlotsPerFrame refers to the number of consecutive slots per frame, periodicity denotes a periodicity configured for SPS, nrofHARQ-Processes denotes number of configured HARQ processes for SPS provided by SPS configuration information (SPS-Config), harq-ProcID-Offset denotes an offset used in deriving HARQ process IDs provided by SPS configuration information (SPS-Config).

18. The apparatus according to claim 17, wherein if number of repetitions for SPS PDSCH (pdsch-AggregationFactor) is configured in SPS configuration information (SPS-Config), a TB is repeated with different RVs within same symbol allocation among each of the pdsch-AggregationFactor consecutive slots.

19. An apparatus for transmitting signals, applicable to a network device, the apparatus comprising:

a transmitter configured to transmit downlink control information (DCI), the DCI is used for scheduling of one or a plurality of physical downlink shared channels (PDSCHs) or Semi-Persistent Scheduling (SPS) activation, wherein when the DCI is a first DCI used for scheduling the one or the plurality of physical downlink shared channels, a value m of a time domain resource assignment field in the DCI indicating a row index m+1 to a resource allocation table in which one or more rows contain a plurality of start and length indicators (SLIVs), wherein m is an integer greater than or equal to 0;

when the DCI is a second DCI used for the Semi-Persistent Scheduling (SPS) activation, the time domain resource assignment field in the DCI indicates a row with single SLIV; and the transmitter further configured to transmit a SPS PDSCH after transmitting the second DCI.

20. A communication system comprising:

a network device configured to transmit downlink control information (DCI), the DCI is used for scheduling one or a plurality of physical downlink shared channels (PDSCHs) or Semi-Persistent Scheduling (SPS) activation; and a terminal equipment configured to receive the DCI, wherein when the DCI is a first DCI used for scheduling the one or the plurality of physical downlink shared channels, a value m of a time domain resource assignment field in the first DCI indicating a row index m+1 to a resource allocation table in which one or more rows contain a plurality of start and length indicators (SLIVs), wherein m is an integer greater than or equal to 0, when the DCI is a second DCI used for the SPS activation, the time domain resource assignment field in the DCI indicates a row with single SLIV, and the terminal equipment is further configured to receive a SPS PDSCH after receiving the second DCI.

* * * * *